United States Patent
Kakihara

(10) Patent No.: US 7,146,540 B2
(45) Date of Patent: Dec. 5, 2006

(54) DISC ARRAY DEVICE AND DIAGNOSTIC CONTROL METHOD THEREOF

(75) Inventor: Shinobu Kakihara, Odawara (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 10/864,548

(22) Filed: Jun. 10, 2004

(65) Prior Publication Data

US 2005/0240802 A1    Oct. 27, 2005

(30) Foreign Application Priority Data

Apr. 9, 2004   (JP)   ............................. 2004-115191

(51) Int. Cl.
*G06F 11/00* (2006.01)
(52) U.S. Cl. .......................................... 714/31; 714/27
(58) Field of Classification Search ................ 714/31
See application file for complete search history.

(56) References Cited

U.S. PATENT DOCUMENTS

| | | | |
|---|---|---|---|
| 4,095,094 A * | 6/1978 | Struger et al. ............... 714/31 |
| 4,885,683 A * | 12/1989 | Coogan ....................... 714/36 |
| 5,124,987 A | 6/1992 | Milligan et al. |
| 5,185,745 A * | 2/1993 | Manca, Jr. ................... 714/726 |
| 5,504,882 A * | 4/1996 | Chai et al. ................... 714/5 |
| 5,651,110 A | 7/1997 | Powers et al. |
| 6,094,728 A | 7/2000 | Ichikawa et al. |
| 6,473,868 B1 * | 10/2002 | Fujitani ....................... 714/8 |
| 6,578,158 B1 * | 6/2003 | Deitz et al. ................... 714/11 |
| 6,636,933 B1 * | 10/2003 | MacLellan et al. .......... 710/317 |
| 6,684,295 B1 | 1/2004 | Fujimoto et al. |
| 2004/0054866 A1 | 3/2004 | Blumenau |
| 2004/0078517 A1 | 4/2004 | Kaneko et al. |

FOREIGN PATENT DOCUMENTS

JP       2003-068865        8/2001

OTHER PUBLICATIONS

Dual Controller Configurations Using the Mylex DAC960SX and DAC906SXI Disc Array Controllers, Mylex, May 4, 1997. pp. 1-9.

* cited by examiner

*Primary Examiner*—Robert Beausoliel
*Assistant Examiner*—Gabriel L. Chu
(74) *Attorney, Agent, or Firm*—Reed Smith LLP; Stanley P. Fisher, Esq.; Juan Carlos A. Marquez, Esq.

(57) ABSTRACT

A disc array device receives a hardware diagnosis after shipment of the disc array device at short times during an operation of the device and a diagnostic rate is enhanced and an internal failure of a LSI can be detected at a device level. By at least one MP of a redundant-constitution channel interface control adaptor, a hardware diagnosis of a part in a channel interface control adaptor is made, and hardware diagnoses of a part in a CACHE and a part in a cache path switch are made through a diagnostic interface. By at least one MP of the redundant-constitutional disc drive interface control adaptor, a hardware diagnosis of a part in the disc drive interface control adaptor is made, and hardware diagnoses of a part in the CACHE and a part in the cache path switch are made through a diagnostic interface.

18 Claims, 24 Drawing Sheets

DISC ARRAY DEVICE AND DIAGNOSTIC CONTROL METHOD THEREOF

CROSS-REFERENCE TO RELATED APPLICATION

The present application claims priority from Japanese patent application No. JP 2004-115191 filed on Apr. 9, 2004, the content of which is hereby incorporated by reference into this application.

BACKGROUND OF THE INVENTION

The present invention relates to a disc array device integrating a hardware diagnostic function and a diagnostic control method of the disc array device and, particularly, to a technique effectively applied to a diagnosis of the device during its operation.

Conventionally, a hardware diagnosis of a disc array device has been made as follows. That is, before shipment of the disc array device, respective packages constituting the disc array device are individually hardware-diagnosed using a package tester (in-circuit tester). Or, after the shipment of the disc array device, a dedicated program is executed in the disc array device, whereby the hardware diagnosis is made in an assembled state of the respective packages.

Further, as a technique for diagnosing each functional block of a semiconductor device having been shipped already, Japanese Patent Laid-Open No. 2003-68865 discloses a self-diagnosis apparatus of a semiconductor device, in which a self-diagnosis circuit is provided in each functional block, and diagnostic conditions are transmitted from a self-diagnostic controller to each functional block in accordance with the diagnostic program stored preliminarily in a memory, and a normal or abnormal display is indicated based on diagnostic results from the self-diagnostic circuit of each functional block.

SUMMARY OF THE INVENTION

As for the conventional hardware diagnosis of a disc array device, the hardware diagnosis of each package has been individually made by the package tester etc. before the shipment of the disc array device. However, after the shipment of the disc array device, the dedicated test program has been executed to make the hardware diagnosis in an assembled state of each package.

Accordingly, in the hardware diagnosis after the shipment of the disc array device, only the diagnosis by the dedicated test program is made and, therefore, it is difficult to remove various failure modes at short times by only the dedicated test program. Further, it is difficult to locate an internal failure of an LSI in each package of the disc array device.

Further, Japanese Patent Laid-Open No. 2003-68865 discloses that each functional block of the semiconductor device after the shipment is diagnosed by the self-diagnosis function. However, since the diagnosis is performed by only one self-diagnosis controller, the diagnosis becomes impossible when the self-diagnosis controller has a breakdown. Additionally, since a control line is required for each functional block, the number of diagnostic wirings for the individual diagnosis is increased.

Hence, an object of the present invention is to provide a disc array device and a diagnostic control method of the disc array device, in which a hardware diagnosis after the shipment of a disc array device can be made at short times during its operation and a diagnostic rate is high and the internal failure of an LSI can be detected at a device level.

The above and other objects and novel features will be become apparent from the description of this specification and the accompanying drawings.

Outlines of representative ones of inventions disclosed in this application will be briefly described as follows.

A disc array device according to the present invention comprises: a channel interface control adaptor connected to a host computer and having a redundant constitution as an internal constitution in which data transfer and control are performed by a process of a microprocessor; a plurality of disc drives for storing data; a disc drive interface control adaptor connected to said disc drives and having a redundant constitution as an internal constitution in which data transfer and control are performed by a process of a microprocessor; a cache memory in which data to be transferred between said host computer and each of said plurality of disc drives is temporarily stored; and a cache path switch connected to said channel interface control adaptor, the disc drive interface control adaptor, and the cache memory and making an internal bus connection, wherein said channel interface control adaptor, said disc drive interface control adaptor, said cache memory, and said cache path switch each has a data transfer interface and a diagnostic interface, wherein by at least one microprocessor of said channel interface control adaptor having the redundant constitution, a hardware diagnosis of a part in said channel interface control adaptor is made, and hardware diagnoses of a part in said cache memory and a part in said cache path switch are made through said diagnostic interface of said channel interface control adaptor, and wherein by at least one microprocessor of said disc drive interface control adaptor having the redundant constitution, a hardware diagnosis of a part in said disc drive interface control adaptor is made, and hardware diagnoses of a part in said cache memory and a part in said cache path switch are made through said diagnostic interface of said disc drive interface control adaptor.

Meanwhile, a diagnostic control method of a disc array device according to the present invention, the disc array device including: a channel interface control adaptor connected to a host computer and having a redundant constitution as an internal constitution in which data transfer and control are performed by a process of a microprocessor; a plurality of disc drives for storing data; a disc drive interface control adaptor connected to said disc drives and having a redundant constitution as an internal constitution in which data transfer and control are performed by a process of a microprocessor; a cache memory in which data to be transferred between said host computer and each of said plurality of disc drives is temporarily stored; and a cache path switch connected to said channel interface control adaptor, the disc drive interface control adaptor, and the cache memory and making an internal bus connection, wherein said channel interface control adaptor, said disc drive interface control adaptor, said cache memory, and said cache path switch each has a data transfer interface and a diagnostic interface, the method comprises the steps of: by at least one microprocessor of said channel interface control adaptor having the redundant constitution, making a hardware diagnosis of a part in said channel interface control adaptor, and making hardware diagnoses of a part in said cache memory and a part in said cache path switch through said diagnostic interface of said channel interface control adaptor; and by at least one microprocessor of said disc drive interface control adaptor having the redundant constitution, making a hardware diagnosis of a part in said disc drive interface control adaptor, and making hardware diagnoses of a part in said cache memory and a part in said cache path switch through said diagnostic interface of said disc drive interface control adaptor.

DESCRIPTION OF THE PREFERRED EMBODIMENTS

Hereinafter, an embodiment of the present invention will be detailed based on the drawings. Note that the same members are denoted by the same reference symbol in principle throughout all the drawings for explaining the embodiment and the repetitive description thereof will be omitted.

<Concept of Invention>

In the present invention, each internal constitution of a channel interface control adaptor and a disc drive interface control adaptor is set to a redundant constitution; a diagnostic interface other than a data transfer interface is provided to each of the channel interface control adaptor, the disc drive interface control adaptor, a cache memory, and a cache path switch; by at least one microprocessor of the channel interface control adaptor having the redundant constitution, hardware diagnoses are made of parts in the channel interface control adaptor and hardware diagnoses are made of respective parts in the cache memory and the cache path switch through the diagnostic interface; by at least one microprocessor of the disc drive interface control adaptor having the redundant constitution, hardware diagnoses are made of parts in the disc drive interface control adaptor; and hardware diagnoses are made of respective parts in the cache memory and the cache path switch through the diagnostic interface.

<Whole Constitutional Example of Disc Array Device>

Figure 1:
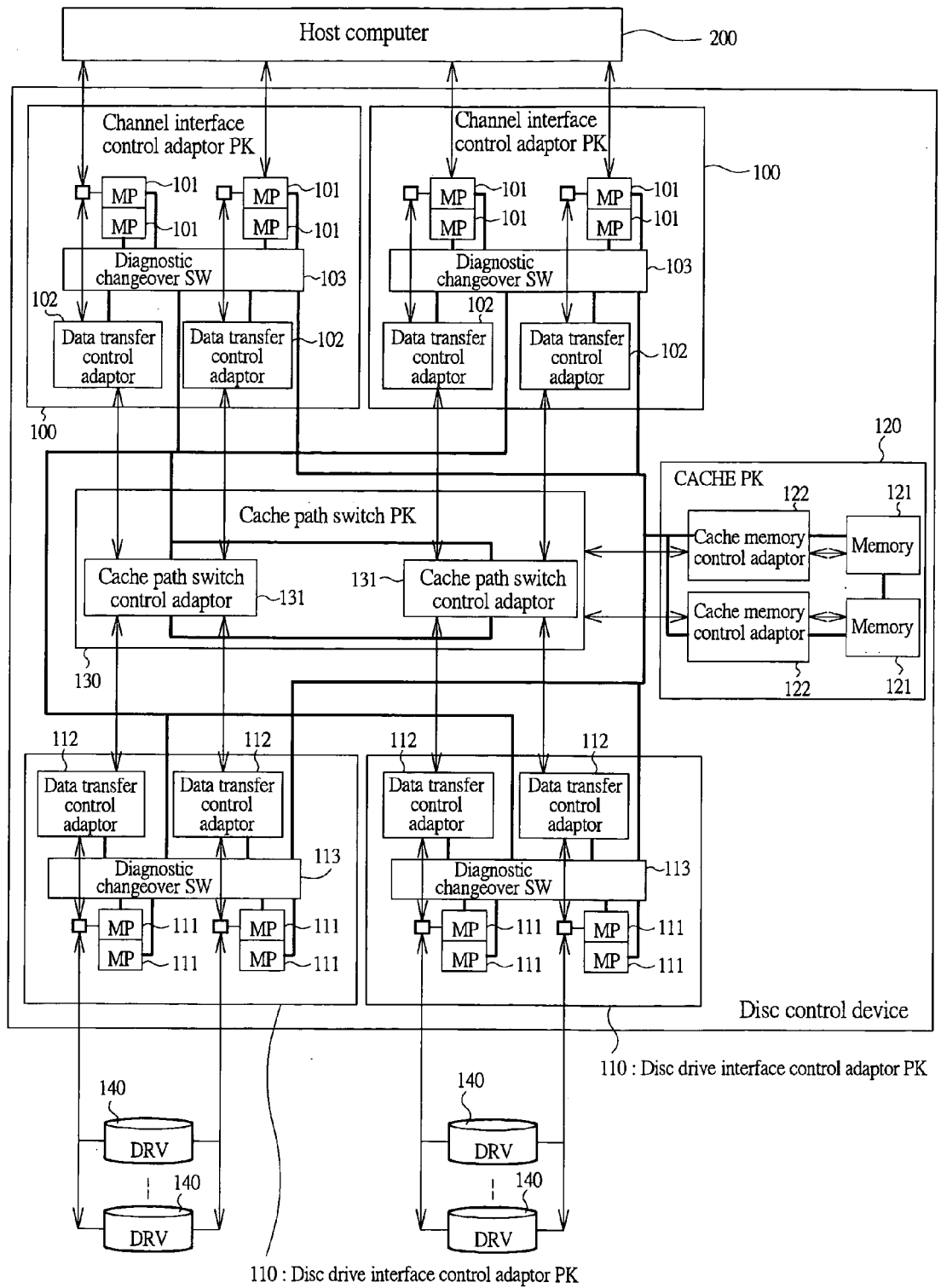
FIG. 1 is a block diagram showing the whole constitution of a disc array device according to one embodiment of the present invention.

One example of the whole constitution of the disc array device according to one embodiment of the present invention will be described with reference to FIG. 1. FIG. 1 is a block diagram showing the whole constitution of the disc array device according to one embodiment of the present invention.

In FIG. 1, the disc array device comprises: a disc control device including a channel inter face control adaptor 100, a disc drive interface control adaptor 110, a cache memory (hereinafter abbreviated as "CACHE") 120, and a cache path switch 130; and a disc drive (hereinafter abbreviated as "DRV") connected to the disc drive interface control adaptor 110 of the disc control device.

Further, the channel interface control adaptor 100, the disc drive interface control adaptor 110, the CACHE 120, and the cache path switch 130 are each constituted as a package (hereinafter abbreviated as "PK"), and each PK is connected, for example, by a platter or the like.

The channel interface control adaptor 100 comprises: a microprocessor (hereinafter abbreviated as "MP") 101 performing a process in the channel interface control adaptor 100; a data transfer control adaptor 102 for transmitting and receiving data; and a diagnostic changeover switch 103 for making changeover at the time of the diagnosis, and has an interface with a host computer 200 and makes an exchange with the data. Further, the MP 101 has a port capable of controlling the diagnosis, wherein the port is connected to the diagnostic changeover switch 103. The PK of the channel interface control adaptor 100 is provided with a diagnostic interface connected to the diagnostic changeover switch 103, and the diagnostic processes of the CACHE 120 and the cache path switch 130 are performed through the diagnostic interface. Further, the data transfer control adaptor 102 is a boundary scan corresponding part and has a self-diagnosis function (hereinafter abbreviated as "BIST function"), and a BIST functional portion is connected to the diagnosis changeover switch 103.

The disc drive interface control adaptor 110 comprises: a MP 111 for performing a process in the disc drive interface control adaptor 110; a data transfer control adaptor 112 for transmitting and receiving data; and a diagnostic changeover switch 113 for making changeover at the time of the diagnosis, and has an interface with the DRV 140 and makes an exchange of data. Further, the MP 111 has a port capable of controlling the diagnosis, wherein the port is connected to the diagnostic changeover switch 113. The PK of the disc drive interface control adaptor 110 is provided with a diagnostic interface connected to the diagnosis changeover switch 113, and performs diagnostic processes of the CAHCE 120 and the cache path switch 130 through the diagnostic interface. Further, the data transfer control adaptor 112 is a boundary scan corresponding part and has a BIST function, and a BIST functional portion is connected to the diagnosis changeover switch 113.

The CACHE 120 comprises a memory 121 and a cache memory control adaptor for controlling the memory 121, and temporarily stores data transmitted to the DRV 140 from the host computer 200 and data transmitted to the host computer 200 from the DRV 140. Further, the PK of the CACHE 120 is provided with a diagnostic interface, and is connected to the diagnostic interface of the channel interface control adaptor 100/disc drive interface control adaptor 110.

Further, each of the memory 121 and the cache memory control adaptor 122 therein is a boundary scan corresponding part and has the BIST function, and the respective parts are connected by a daisy chain and are connected to the diagnostic interface.

The cache path switch 130 comprises a cache path switch control adaptor 131 for adjusting a cache connection, and makes a bus connection therein. Further, the PK of the cache path switch 130 is provided with the diagnostic interface, and is connected to the diagnostic interfaces of the channel interface control adaptor 100/disc drive interface control adaptor 110. Further, the cache path switch control adaptor 131 therein is a boundary scan corresponding part and has the BIST function, and the respective parts are connected by the daisy chain and are connected to the diagnostic interface.

There are provided a plurality of DRVs 140, and a RAID (Redundant Array of Inexpensive Discs) are constituted by, for example, the plurality of DRVs 140.

Further, the channel interface control adaptor 100 and the disc drive interface control adaptor 110 each has two (or more than two) of data transfer paths in the PK and have redundant constitutions. Therefore, even when one of the redundant constitutions has a breakdown, a data transfer operation is possible and further even when the disc array device is under the operation, the data transfer is performed by the one of the redundant constitutions and the process of the hardware diagnosis is performed by the other constitution, whereby it is possible to make the hardware diagnosis.

<Data Transfer>

Figure 2:
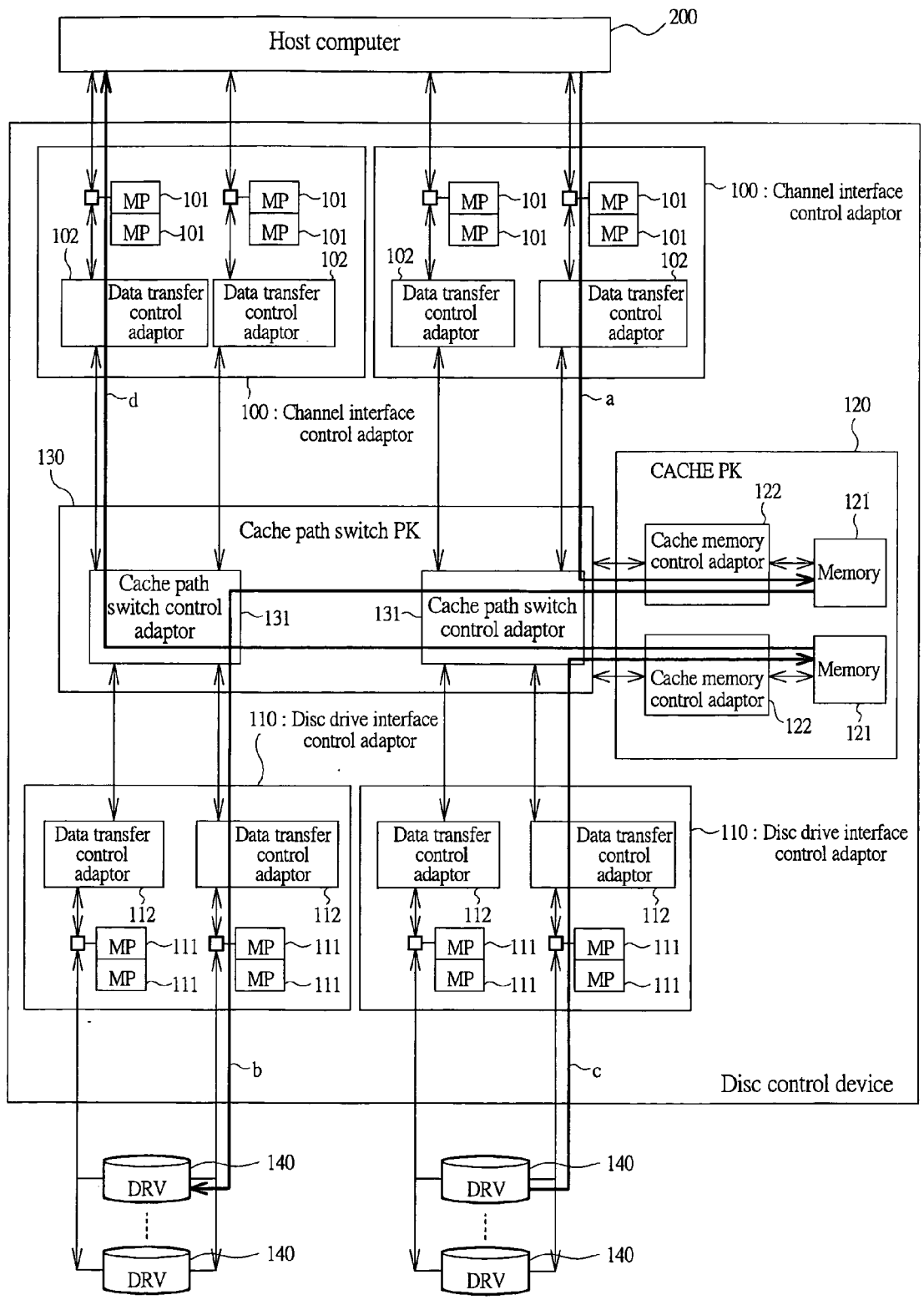
FIG. 2 is an explanatory view for explaining an operation of data transfer of the disc array device according to one embodiment of the present invention.

An operation of the data transfer of the disc array device according to one embodiment of the present invention will be described with reference to FIG. 2. FIG. 2 is an explanatory view for explaining the operation of the data transfer, wherein wirings for hardware diagnosis and the like are omitted.

In FIG. 2, the reference character "a" shows a flow of data transferred from the host computer 200 to the CACHE 120, "b" shows a flow of data transferred from the CACHE 120 to the DRV 140, "c" shows a flow of data transferred from the DRV 140 to the CACHE 120, and "d" shows a flow of data transferred from the CACHE 120 to the host computer 200.

First, with respect to the data transfer from the host computer 200 to the CACHE 120, as shown by "a" of FIG. 2, the data from the host computer 200 is transferred to the cache path switch 130 through the data transfer control adaptor 102 of the channel interface control adaptor 100, and is transferred to the CACHE 120 by the cache path switch control adaptor 131 of the cache path switch 130. In the CACHE 120, the data from the host computer 200 is stored in the memory 121 through the cache memory control adaptor 122.

Further, with respect to the data transfer from the CACHE 120 to the DRV 140, as shown by "b" FIG. 2B, the data stored in the CACHE 120 is transferred to the cache path switch 130 through the cache memory control adaptor 122, and is transferred to the disc drive interface control adaptor 110 by the cache path switch control adaptor 131 of the cache path switch 130, and is transferred to the DRV 140 through the data transfer control adaptor 112 of the disc drive interface control adaptor 110 and is stored in the DRV 140.

Further, with respect to the data transfer from the DRV 140 to the CACHE 120, as shown in "c" of FIG. 2, the data stored in the DRV 140 is transferred to the cache path switch 130 through the data transfer control adaptor 112 of the disc drive interface control adaptor 110, and is transferred to the CACHE 120 by the cache path switch control adaptor 131 of the cache path switch 130. In the CACHE 120, the data from the DRV 140 is stored in the memory 121 through the cache memory control adaptor 122.

Further, with respect to the data transfer from the CACHE 120 to the host computer 200, as shown in "d" of FIG. 2, the data stored in the CACHE 120 is transferred to the cache path switch 130 through the cache memory control adaptor 122, and is transferred to the channel interface control adaptor 100 by the cache path switch control adaptor 131 of the cache path switch 130, and is transferred to the host computer 200 through the data transfer control adaptor 102 of the channel interface control adaptor 100.

Thus, in a normal data transfer of the disc array device, the channel interface control adaptor 100 and the disc drive interface control adaptor 110 perform the data transfers between them and the CACHE 120 through the cache path switch 130, and perform the data transfer from the host computer 200 to the DRV 140 and the data transfer from the DRV 140 to the host computer 200.

Further, since the channel interface control adaptor 100 and the disc drive interface control adaptor 110 adopt the above-mentioned redundant constitutions, the operation of each data transfer is possible even when one of the redundant constitutions has a breakdown. Also, even during the data transfer as shown in FIG. 2, the data transfer can be performed by one of the redundant constitutions and the hardware diagnostic process can be performed by the other constitution.

Further, since each PK of the cache path switch 130 and the CACHE 120 is set to have a redundant constitution, the data transfer is performed by the PK of one of the redundant constitutions and it is possible to make the hardware diagnosis of the PK of the other from the channel interface control adaptor 100 and the disc drive interface control adaptor 110.

<Path Connection>

Figure 3:
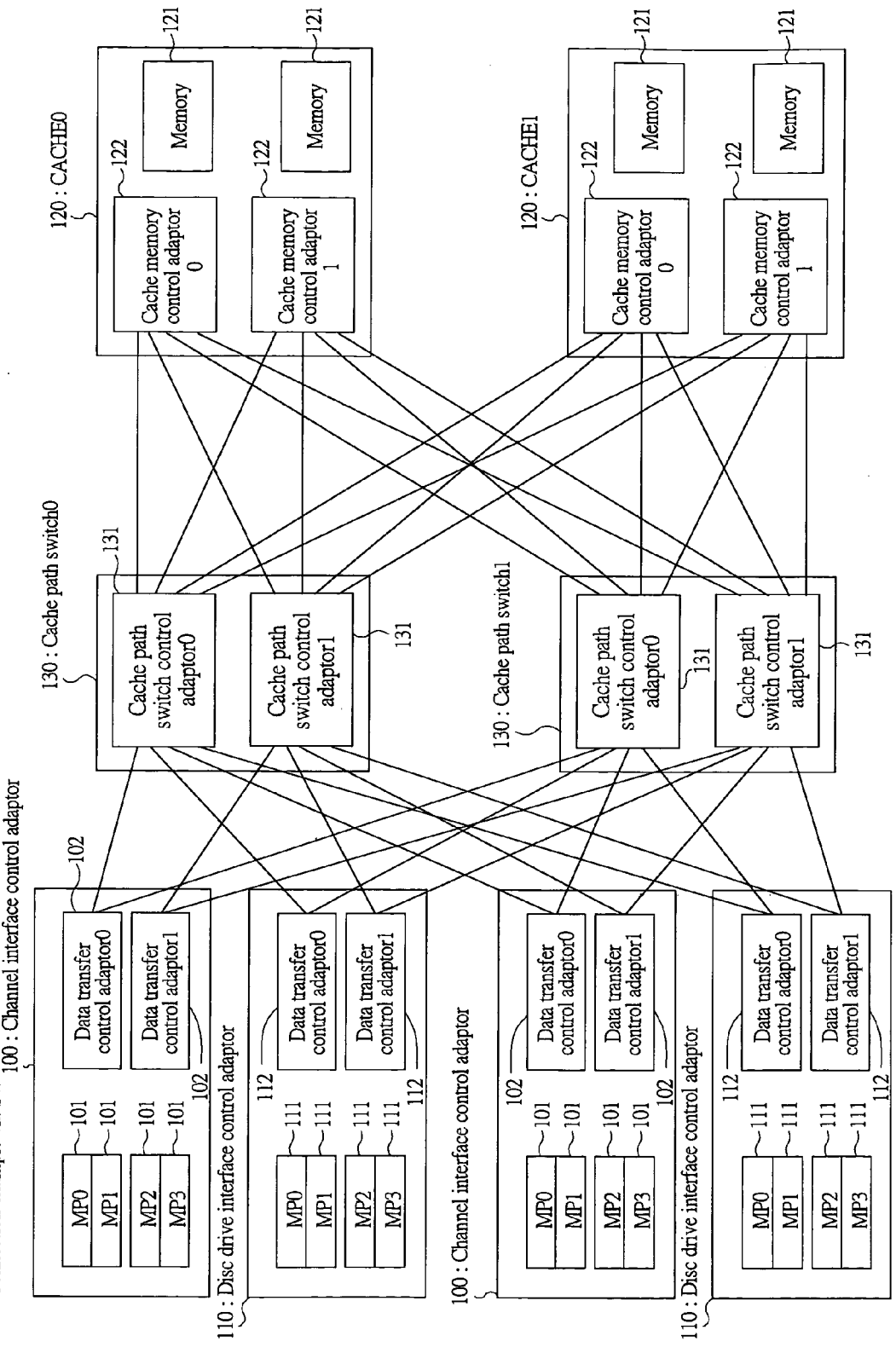
FIG. 3 is a view showing one example of a path connection by a cache path switch of the disc array device according to one embodiment of the present invention.
Figure 4:
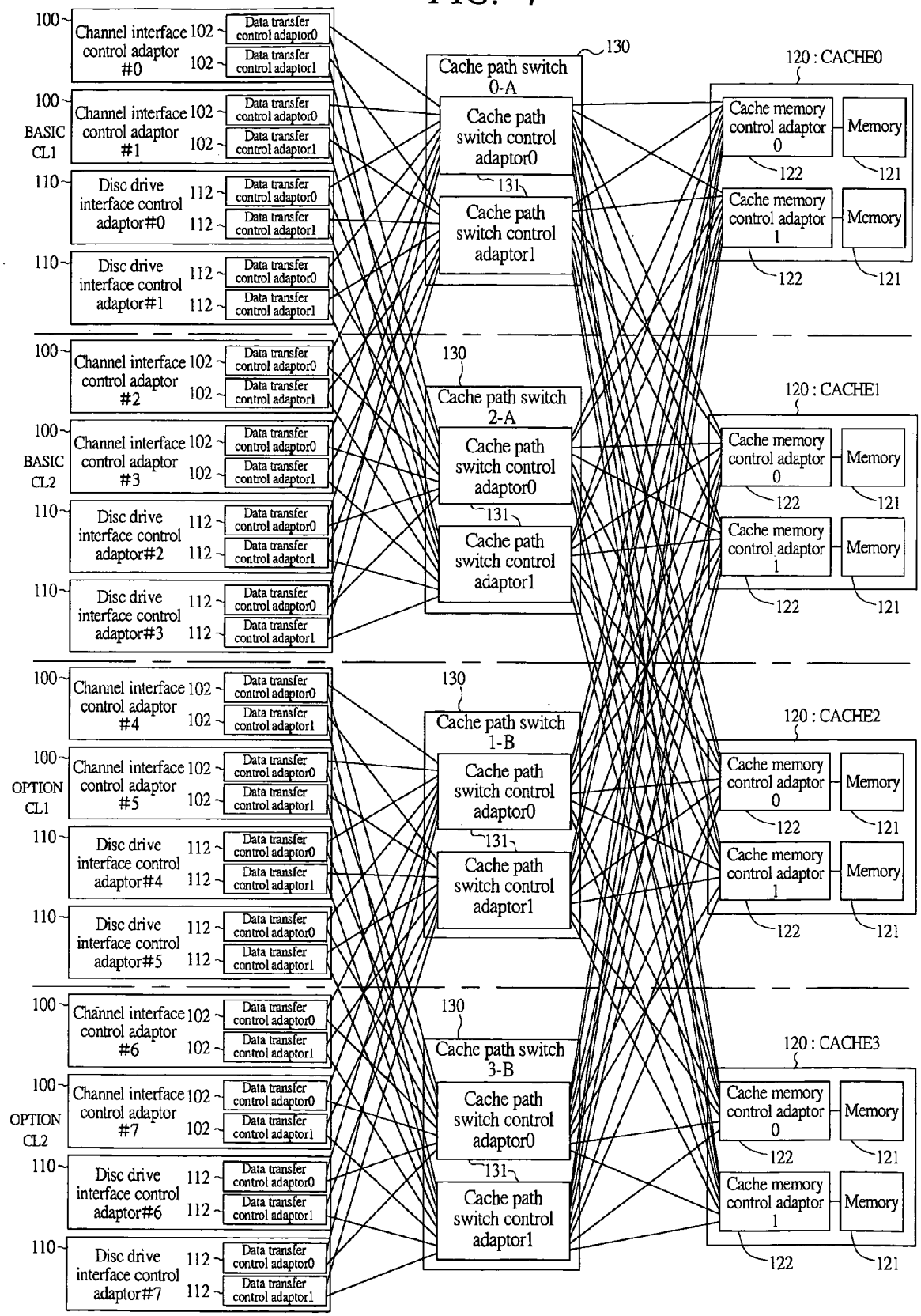
FIG. 4 is a view showing another example of a path connection by a cache path switch of the disc array device according to one embodiment of the present invention.
Figure 5:
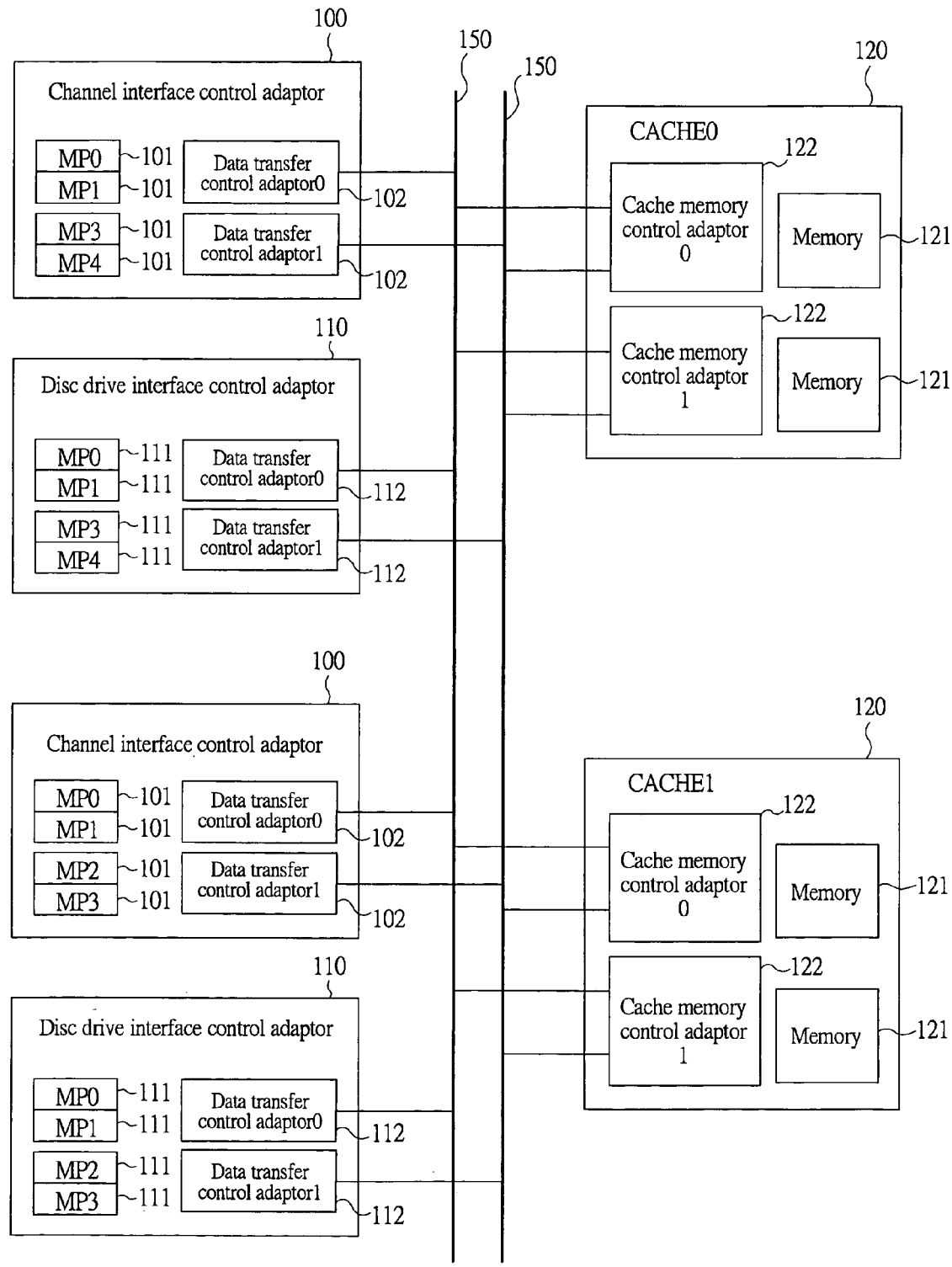
FIG. 5 is a view showing one example of the path connection by a common bus of the disc array device according to one embodiment of the present invention.
Figure 6:
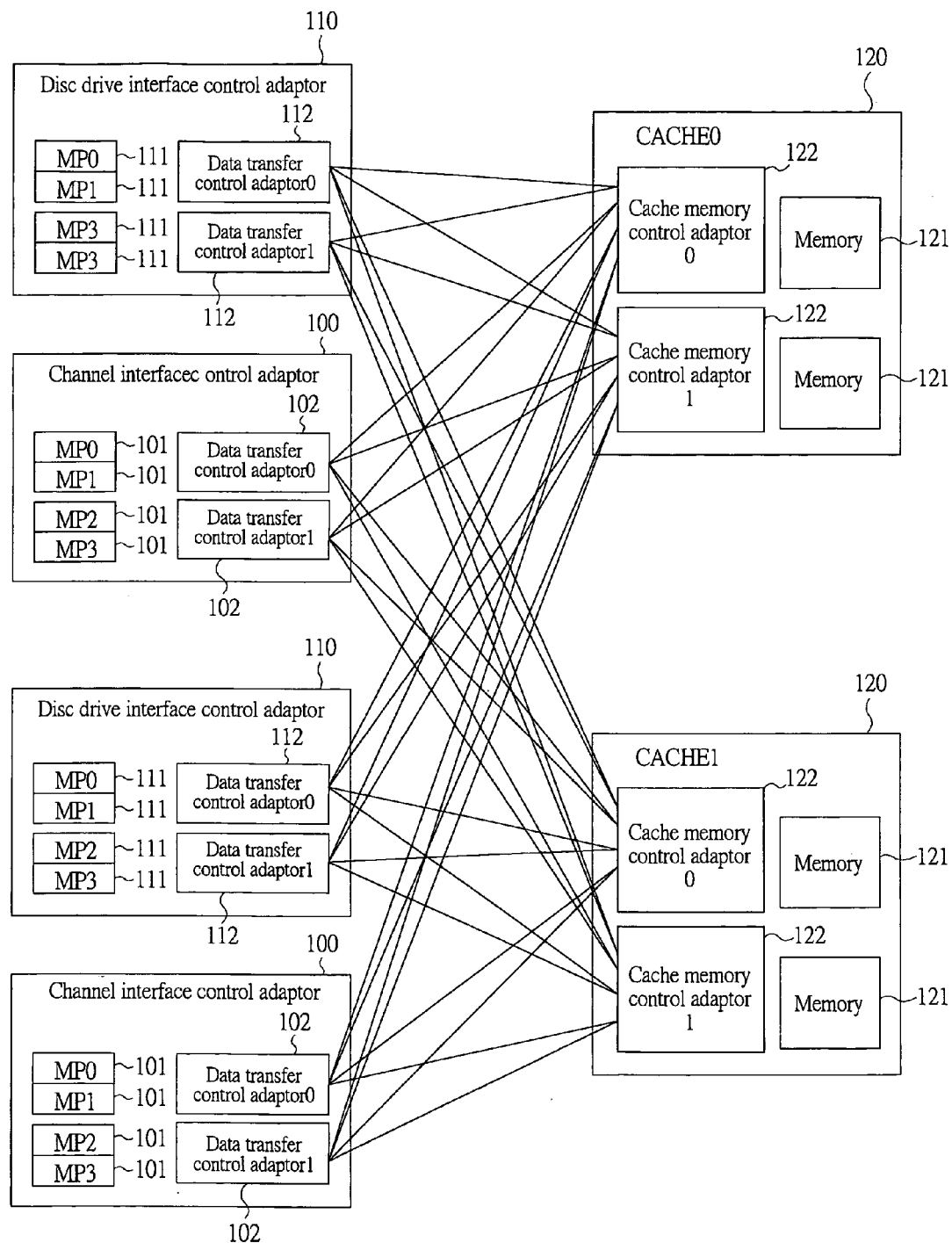
FIG. 6 is a view showing one example of a path connection by a direct connection of the disc array device according to one embodiment of the present invention.

Each path connection among the channel interface control adaptor 100, the disc drive interface control adaptor 110, and the CACHE 120 in the disc array device according to one embodiment of the present invention will be described with reference to FIGS. 3 to 6. FIG. 3 is a view showing one example of a path connection by the cache path switch; FIG. 4 is a view showing another example of the path connection by the cache path switch; FIG. 5 is a view showing one example of the path connection by a common bus; and FIG. 6 is a view showing one example of the path connection by a direct connection.

In the present embodiment, as shown in FIG. 1, the channel interface control adaptor 100, the disc drive interface control adaptor 110, and the CACHE 120 are connected through the cache path switch 130. As for a mode of each path connection, as shown in FIG. 3, for example, if the channel interface control adaptor 100 and the disc drive interface control adaptor 110 are path-connected to two CACHEs 120 (CACHE 0 and CACHE 1) through the two cache path switches 130 (cache path switches 0 and 1), then the channel interface control adaptor 100 and the disc drive interface control adaptor 110 each has a path capable of being connected to both of the two cache path switches 130 (cache path switches 0 and 1) and each of the two cache path switches 130 (cache path switches 0 and 1) also has a path capable of being connected to both of the two CACHEs 120 (CACHE 0 and CACHE 1).

Further, as shown in FIG. 4, for example, in the case where the constitution shown in FIG. 1 is made as clusters (CL 1 and CL 2) of a basic portion (BASIC) and clusters (CL 1 and CL 2) of an expanded portion (OPTION) in the disc array device, each of the channel interface control adaptor 100 and the disc drive interface control adaptor 110 in the clusters (CL 1 and CL 2) of the basic portion (BASIC) has a path capable of being connected to both of the cache path switches 130 (cache path switches (0-A) and (2-A)) of the clusters (CL 1 and CL 2) of the basis portion (BASIC), and each of the channel interface control adaptor 100 and the disc drive interface control adaptor 110 in the clusters (CL1 and CL2) of the expanded portion (OPTION) has a path capable of being connected to both of the cache path switches 130 (cache path switches (1-B) and (3-B)) in the clusters (CL 1 and CL 2) of the expanded portion (OPTION).

Further, each of the cache path switches 130 (cache path switches (0-A), (2-A), (1-B) and (3-B)) in the clusters (CL 1 and CL 2) of the basic portion (BASIC) and the expanded portion (OPTION) has a path capable of being connected to all the CAHCEs 120 (CACHEs 0, 1, 2, and 3) in the clusters (CL 1 and CL2) of the basic portion (BASIC) and the expanded portion (OPTION).

Note that, the present invention can make the hardware diagnoses by the channel interface control adaptor 100 and the disc drive interface control adaptor 110, not only in the path connection through the cache path switch 130 as shown in FIGS. 3 and 4, but also in the path connection through the common bus 150 as shown in FIG. 5 and a path connection to directly connect the channel interface control adaptor 100 and the disc drive interface control adaptor 110 to the CACHE 120 as shown in FIG. 6.

<Initial Diagnosis at Power-On Time>

Figure 7:
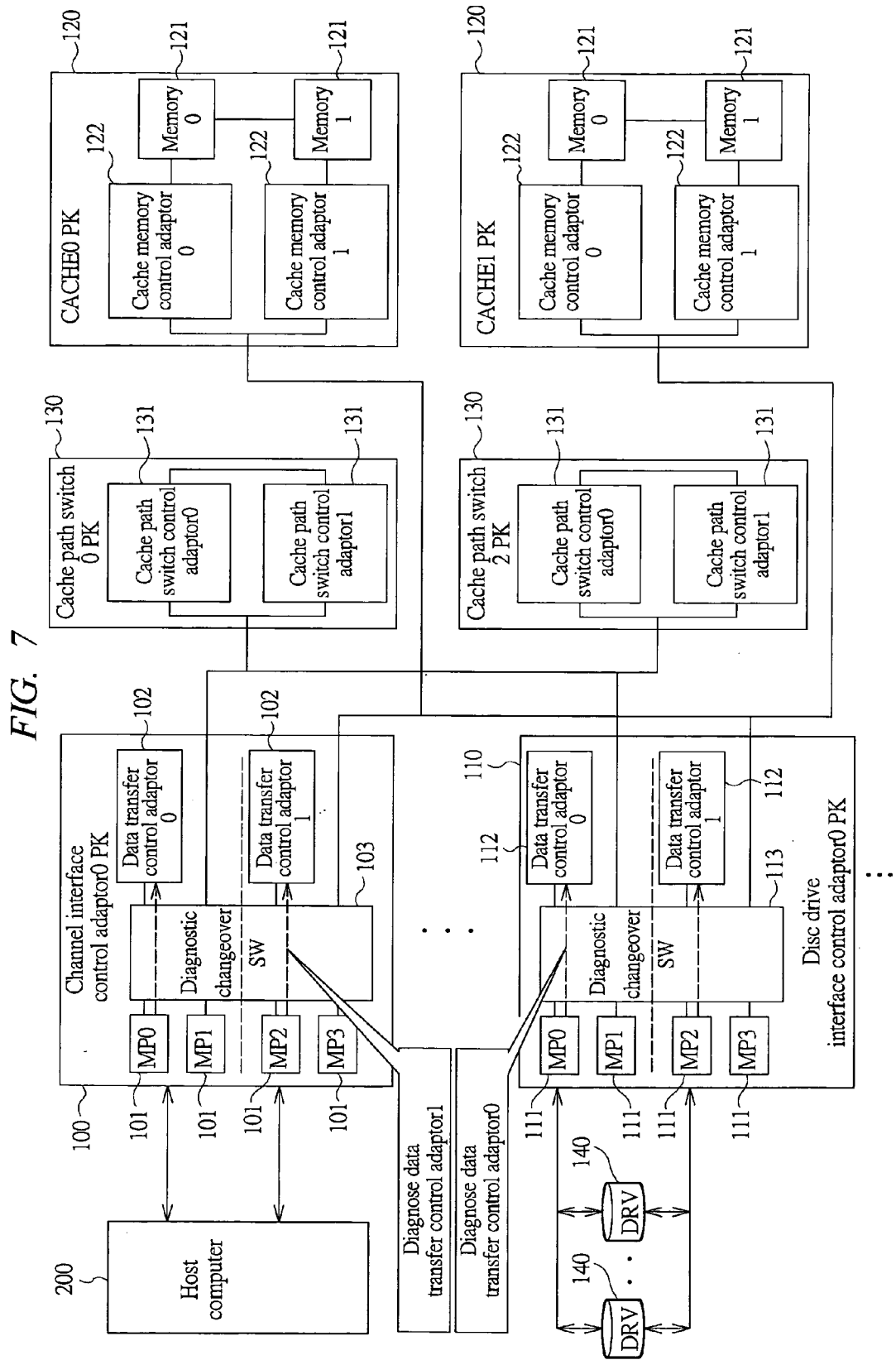
FIG. 7 is an explanatory view for explaining diagnostic operations of the interiors of a channel interface control adaptor and a disc drive interface control adaptor at a power-on time of the disc array device according to one embodiment of the present invention.
Figure 8:
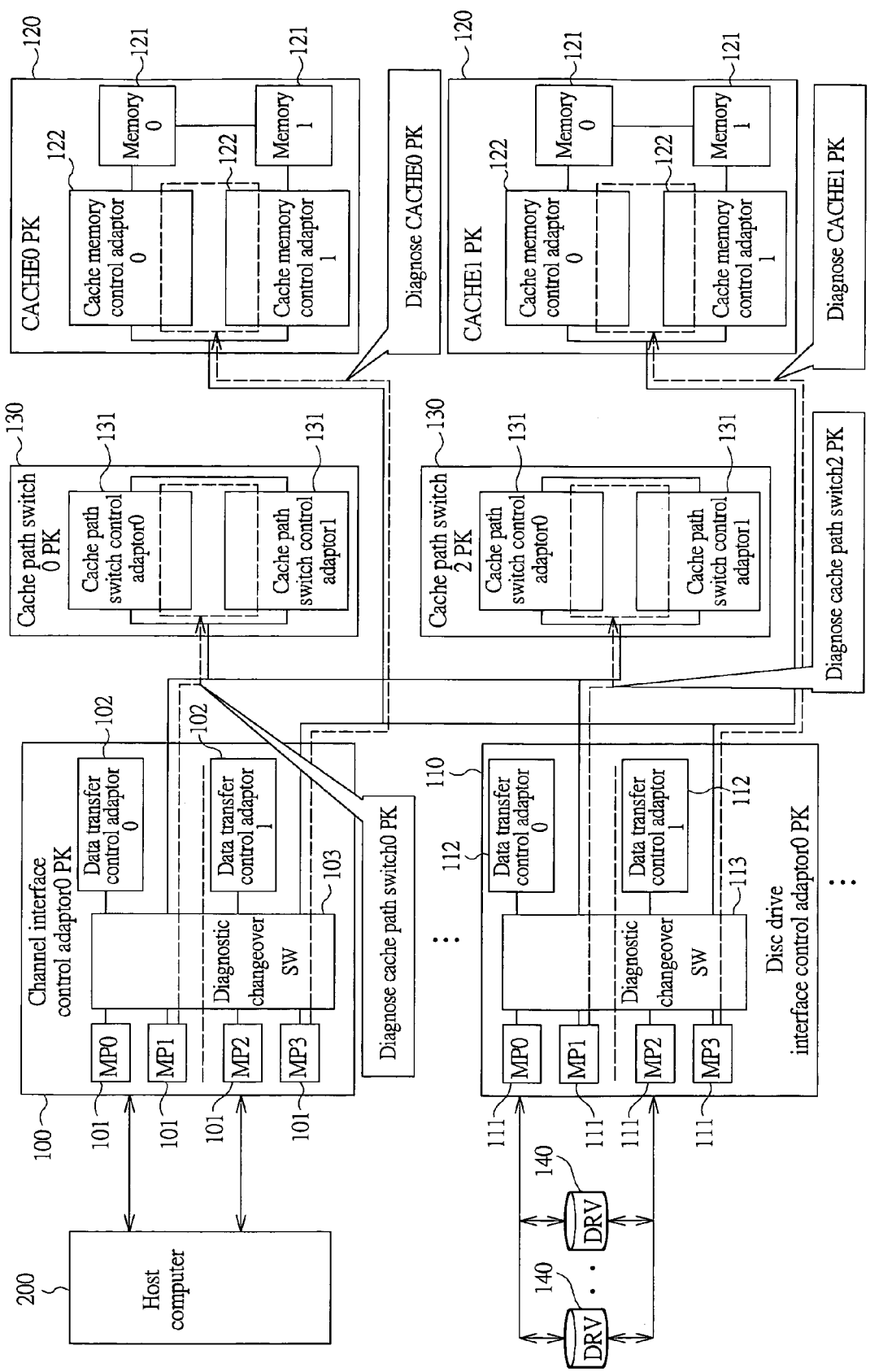
FIG. 8 is an explanatory view for explaining diagnostic operations of a cache path switch and a CACHE at a power-on time of the disc array device according to one embodiment of the present invention.
Figure 9:
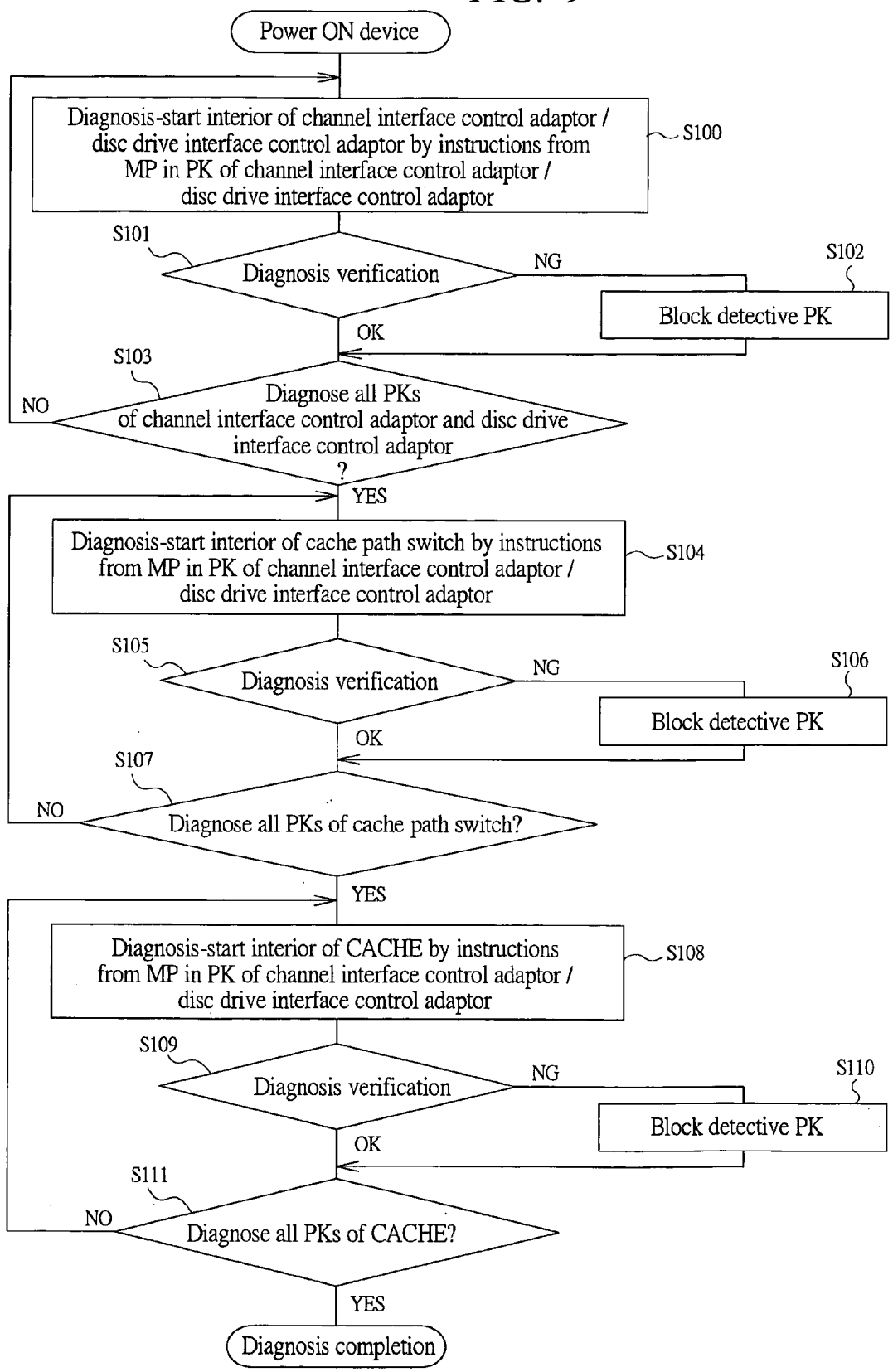
FIG. 9 is a flowchart showing a process operation of an initial diagnosis at a power-on time of the disc array device according to one embodiment of the present invention.

The operation of an initial diagnosis at the power-on time of the disc array device according to one embodiment of the present invention will be described with reference to FIGS. 7 to 9. FIG. 7 is an explanatory view for explaining a diagnostic operation of each interior of the channel interface control adaptor and the disc drive interface control adaptor at the power-on time; FIG. 8 is an explanatory view for explaining the diagnostic operation of each of the cache path switch and the CACHE at the power-on time; and FIG. 9 is a flowchart showing a process operation of the initial diagnostic at the power-on time.

The power-on time of the disc array device is before an operation of the disc array device and the data transfer is not performed. Therefore, as shown in FIG. 7, in the case of diagnosing each interior of the channel interface control adaptor 100 and the disc drive interface control adaptor 110, for example, the diagnoses of the data transfer control adaptors 102 (data transfer control adaptors 0 and 1) are made through the diagnosis changeover switch 103 from the MPs 101 (MP 0 and MP 2) of the channel interface control adaptor 100, and the diagnoses of the data transfer control adaptors 102 (data transfer control adaptors 0 and 1) are made through the diagnosis changeover switch 113 from the MPs 111 (MP 0 and MP 2) of the disc drive interface control adaptor 110. These diagnoses are simultaneously executed in the case where the number of PKs of the channel interface control adaptor 100/disc drive interface control adaptor 110 is two or more.

Further, as shown in FIG. 8, in the case of diagnosing the cache path switch 130 and the CACHE 120, for example, the diagnoses of the cache path switch control adaptors 131 (cache path switch control adaptors 0 and 1) connected by the daisy chain in the cache path switch 130 (cache path switch 0) are made through the diagnostic changeover switch 103 from the MP 101 (MP 1) of the channel interface control adaptor 100; and the diagnoses of the memories 121 (MEM 0 and MEM 1) and the cache memory control adaptor 122 (cache memory control adaptors 0 and 1) connected by the daisy chain in the CACHE 120 (CACHE 0) are made through the diagnostic changeover switch 103 from the MP 101 (MP 3) of the channel interface control adaptor 100.

Further, the diagnoses of the cache path switch control adaptors 131 (cache path switch control adaptors 0 and 1) connected by the daisy chain in the cache path switch 130 (cache path switch 2) is made through the diagnostic changeover switch 113 from the MP 111 (MP 1) of the disc drive interface control adaptor 110; and the diagnoses of the memories 121 (MEM 0 and MEM 1) and the memory control adaptors 122 (cache memory control adaptors 0 and 1) connected by the daisy chain in the CACHE 120 (CACHE 1) are made through the diagnostic changeover switch 113 from the MP 111 (MP 3) of the disc drive interface control adaptor 110.

When each diagnosis of the channel interface control adaptor 100, the disc drive interface control adaptor 110, the CACHE 120, and the path switch control adaptors 131 are all completed, the initial diagnosis at the power-on time is completed.

With respect to the process operation of the initial diagnosis at the power-on time, as shown in FIG. 9, first, the diagnosis in the channel interface control adaptor 100/disc drive interface control adaptor 110 is started by instructions from the MP 101/111 in the PK of the channel interface control adaptor 100/disc drive interface control adaptor 110 (S110). Then, the diagnostic verification in the channel interface control adaptor 100/disc drive interface control adaptor 110 is made (S101); and if the result of the diagnosis at S101 is "NG", a defective PK is blocked (S102).

If the result of the diagnosis at S101 is "OK" or the defective PK at S102 is blocked, it is determined whether or not all the PKs of the channel interface control adaptor 100/disc drive interface control adaptor 110 are diagnosed (S103) and the process of S100 to S103 is repeated until the diagnoses of all the PKs of the channel interface control adaptor 100/disc drive interface control adaptor 110 are completed.

When the diagnoses of all the PKs of the channel interface control adaptor 100/disc drive interface control adaptor 110 at S103 are completed, the diagnosis of the cache path switch 130 is started by the instructions from the MP 101/111 in the PK of the channel interface control adaptor 100/disc drive interface control adaptor 110 (S104). The diagnostic verification of the cache path switch 130 is made (S105), and if the result of the diagnosis at S105 is "NG", a defective PK is blocked (S106).

If the result of the diagnosis at S105 is "OK" or the defective PK is blocked at S106, it is determined whether or not the diagnoses of all the PKs of the cache path switch 130 has been made (S107), whereby the process from S104 to S107 is repeated until the diagnoses of all the PKs of the cache path switch 130 are completed.

When the diagnoses of all the PKs of the cache path switch 130 are completed at S107, the diagnosis of the CACHE 120 is started by instructions from the MP 101/111 in the PK of the channel interface control adaptor 100/disc drive interface control adaptor 110 (S108). Then, the diagnostic verification of the CACHE 120 is made (S109), and when the result of the diagnosis at S109 is "NG", the defective PK is blocked (S110).

If the result of the diagnosis at S109 is "OK" or the defective PK at S110 is blocked, it is determined whether or not the diagnoses of all the PKs of the CACHE 120 have been made (S111). The process from S108 to S111 is repeated until the diagnoses of all the PKs of the CACHE 120 at S111 are completed. When the diagnoses of all the PKs of the CACHE 120 are completed at S111, the diagnosis is completed.

Note that, in each diagnostic verification at S101, S105, and S109, for example, a boundary scan is used to make the diagnostic verification by an Internal net connection diagnosis, a self-diagnosis by the BIST, and various functional diagnoses by software, etc. Further, as for the diagnosis starting operation of the cache path switch 130 at S104 and the diagnosis starting operation of the CACHE 120 at S108, since the cache path switch 130 and the CACHE 120 have a common diagnostic portion, the MP 101/111 of each of the channel interface control adaptor 100/disc drive interface control adaptor 110 performs an exclusion and the representative MP 101/111 makes the diagnosis. These diagnoses of the cache path switch 130 and the CACHE 120 are changed by the diagnostic changeover switches 103 and 113 in the channel interface control adaptor 100/disc drive interface control adaptor 110, so that the diagnosis can be made even from either of the MP 101/111 of the channel interface control adaptor 100/disc drive interface control adaptor 110.

Further, according to the flowchart shown in FIG. 9, though the diagnosis of the PK of the CACHE 120 is performed after the diagnoses of all the PKs of the cache path switch 130 have been completed, it is possible to make the diagnoses of the cache path switch 130 and the CACHE 120 simultaneously.

Further, this embodiment is here described as the initial diagnosis at the power-on time, as shown in FIG. 1. However, since the channel interface control adaptor 100/disc drive interface control adaptor 110 has a redundant constitution and a diagnostic wiring is provided separately from a data transfer path, it is also possible to perform the data transfer during the execution of the initial diagnosis at the power-on time.

<Diagnoses after Maintenance and Replacement and at PK Expansion>

Figure 10:
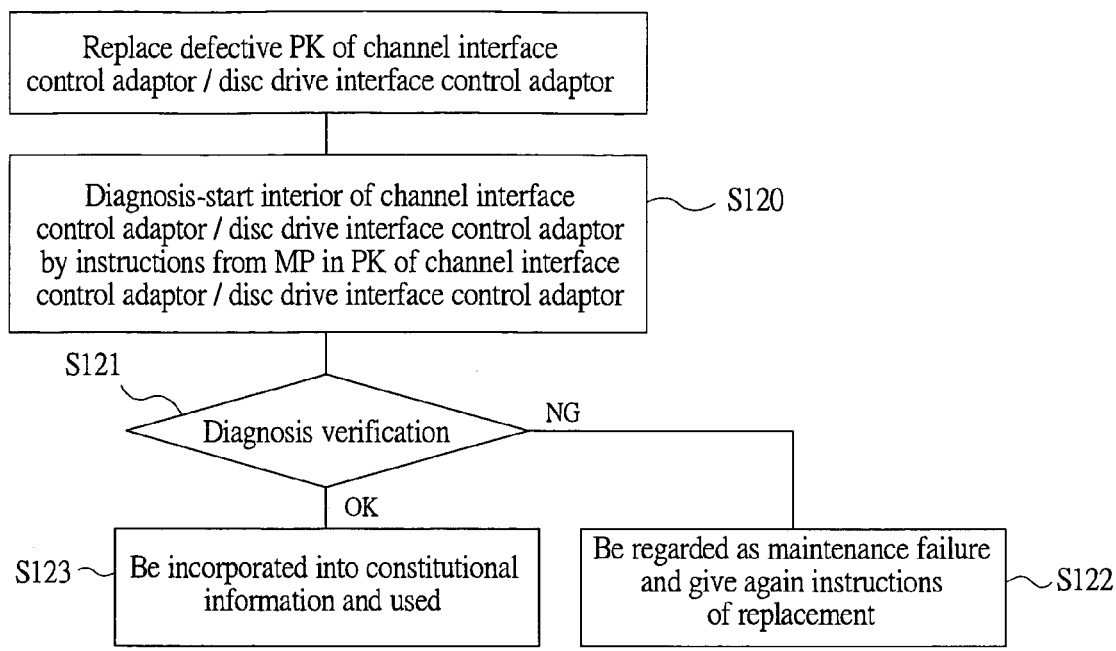
FIG. 10 is a flowchart showing the process operation of the diagnosis after maintenance and replacement of a channel interface control adaptor/disc drive interface control adaptor of the disc array device according to one embodiment of the present invention.
Figure 11:
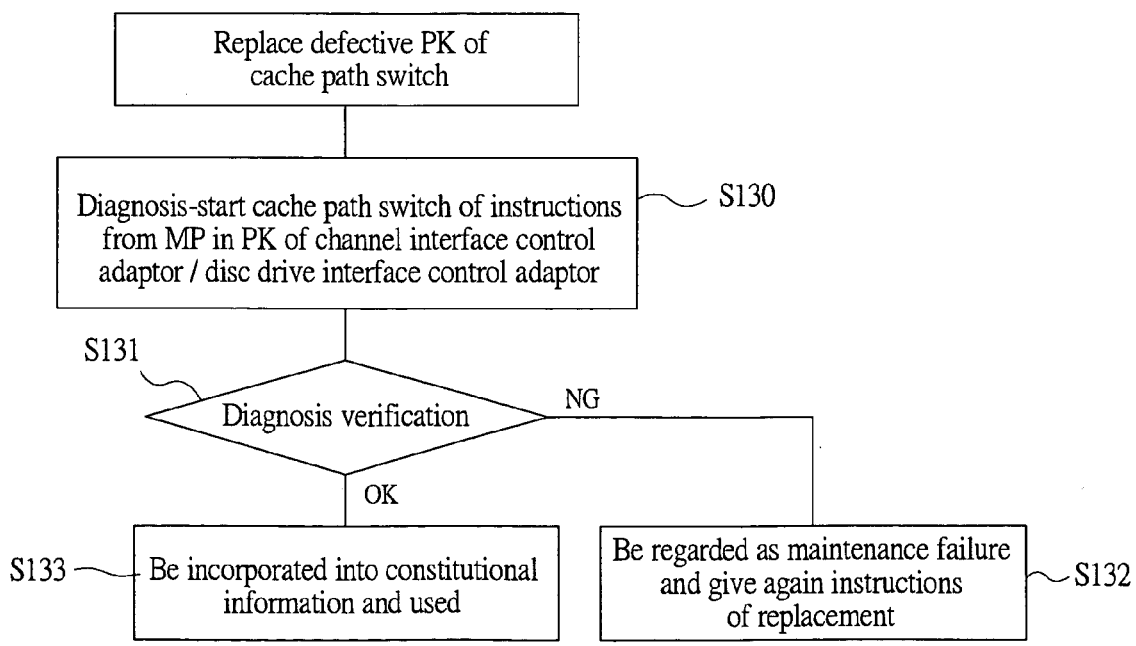
FIG. 11 is a flowchart showing the process operation of the diagnosis after the maintenance and replacement of the cache path switch of the disc array device according to one embodiment of the present invention.
Figure 12:
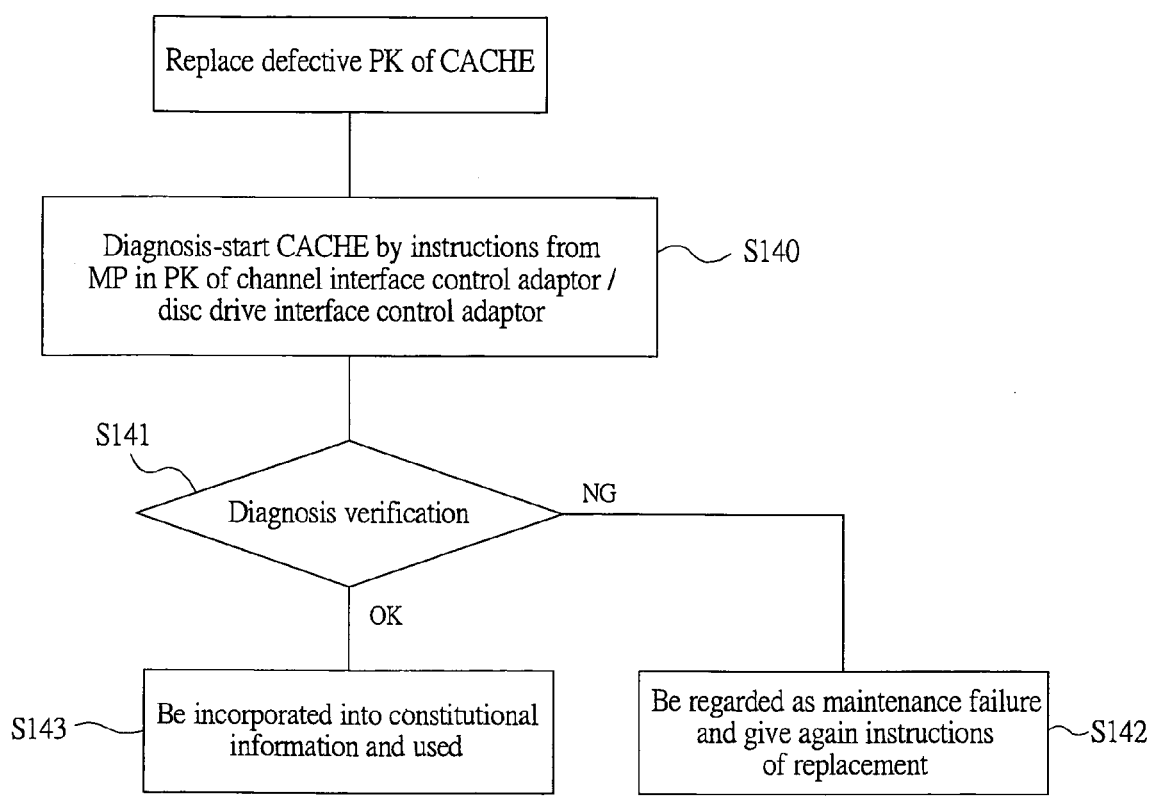
FIG. 12 is a flowchart showing the process operation of the diagnosis after the maintenance and replacement of the CACHE of the disc array device according to one embodiment of the present invention.

The diagnostic operation after maintenance and replacement will be described with reference to FIGS. 7, 8 and 10 to 12. FIG. 10 is a flowchart showing a process operation of the diagnosis after the maintenance and replacement of the channel interface control adaptor/disc drive interface control adaptor; FIG. 11 is a flowchart showing a process operation of the diagnosis after the maintenance and replacement of the cache path switch; and FIG. 12 is a flowchart showing a process operation of the diagnosis after the maintenance and replacement of the CACHE.

As for the diagnosis after the maintenance and replacement of the PK, similarly to the initial diagnosis at the power-on time as shown in FIGS. 7 and 8, the diagnosis is made of the PK that is subjected to the maintenance and replacement.

As for the process operation of the diagnosis at the maintenance and replacement, in case of the maintenance and replacement of the channel interface control adaptor 100/disc drive interface control adaptor 110, as shown in FIG. 10, first, after replacement of the defective PK of the channel interface control adaptor 100/disc drive interface control adaptor 110, the diagnosis in the replaced channel interface control adaptor 100/disc drive interface control adaptor 100 is started by instructions from MP 101/111 in PK of the replaced channel interface control adaptor 100/disc drive interface control adaptor 110 (S120). Then, the diagnostic verification in the channel interface control adaptor 100/disc drive interface control adaptor 110 is made (S121) and if the result of the diagnosis at S121 is "NG", this is regarded as a maintenance failure and instructions of the replacement is given again (S122).

If the result of the diagnosis at S121 is "OK", information on the PK of the replaced channel interface control adaptor 100/disc drive interface control adaptor 110 is incorporated into constitutional information on the disc array device to use the PK (S123).

Further, in the case of the maintenance and replacement of the cache path switch 130, as shown in FIG. 11, first, the defective PK of the cache path switch 130 is replaced and, thereafter, the diagnosis of the replaced cache path switch 130 is started by the instructions from the MP 101/111 in the PK of the channel interface control adaptor 100/disc drive interface control adaptor 110 (S130). Then, the diagnostic verification of the cache path switch 130 is made (S131), and if the result of the diagnosis at S131 is "NG", this is regarded as a maintenance failure and instructions of the replacement are given again (S132).

If the result of the diagnosis at S131 is "OK", information on PK of the replaced cache path switch 130 is incorporated into the constitutional information on the disc array device and is used (S133).

Further, in the case of the maintenance and replacement of the CACHE 120, as shown in FIG. 12, first, the defective PK of the CACHE 120 is replaced and, thereafter, the diagnosis of the replaced CACHE 120 is started by instructions from the MP 101/111 in the PK of the channel interface control adaptor 100/disc drive interface control adaptor 110 (S140). Then, the diagnostic verification of the CACHE 120 is made (S141) and, if the result of the diagnosis at S141 is "NG", this is regarded as a maintenance failure and instructions of the replacement is given again (S142).

If the result of the diagnosis at S141 is "OK", information on the PK of the replaced CACHE 120 is incorporated into constitutional information on the disc array device and is used (S143).

Note that, as for the diagnostic verification at S121, S131, and S141, similarly to the initial diagnosis at the power-on time, for example, a boundary scan is used to make the diagnostic verification by an Internal net connection diagnosis, a self-diagnosis by the BIST, and various functional diagnoses by software, etc. Further, also as for the starting operations of the diagnoses of the cache path switch 130 and the CACHE 120 at S130 and S140, similarly to the initial diagnosis at the power-on time, the MP 101 and MP 111 of each of the channel interface control adaptor 100 and the disc drive interface control adaptor 110 perform exclusion, and the representative MP 101 and MP 111 make the diagnosis, and the diagnosis can be made also from either of the MPs 101 and 111 of the channel interface control adaptor 100 and the disc drive interface control adaptor 110.

Additionally, also as for the diagnosis at the PK expansion, similarly to the diagnosis of the maintenance and replacement of the PK, the diagnosis is made for the expanded PK.

Further, this embodiment has been here described as the diagnoses after the maintenance and replacement and at the expansion of the PK. However, as shown in FIG. 1, since the channel interface control adaptor 100/disc drive interface control adaptor 110 has a redundant constitution and diagnostic wirings are provided separately from a data transfer path, it is also possible to perform the data transfer during the diagnoses after the maintenance and replacement and at the PK expansion.

<Diagnosis During Operation of Disc Array Device>

Figure 13:
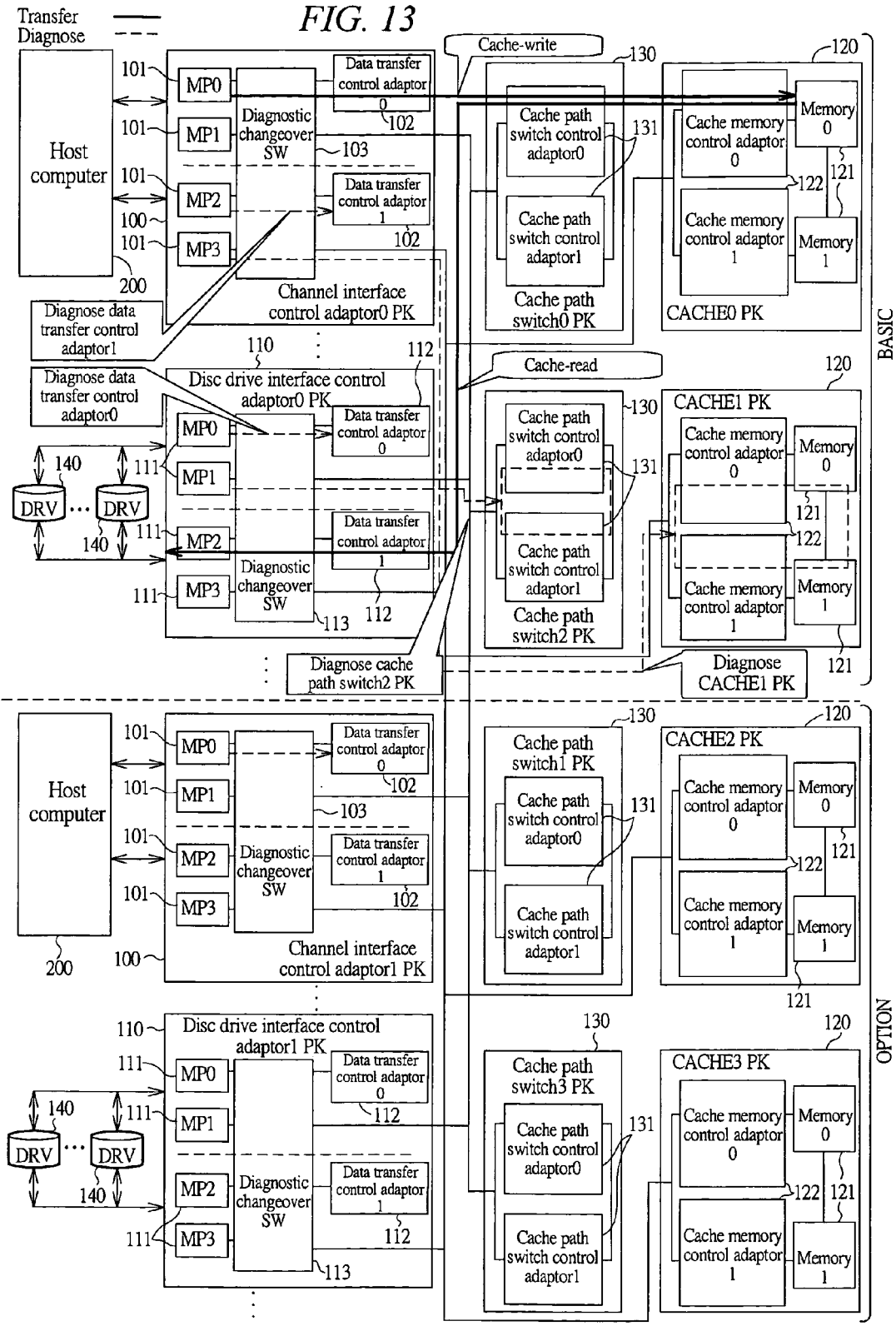
FIG. 13 is an explanatory view for explaining the diagnostic operation during the operation of the disc array device according to one embodiment of the present invention.
Figure 14:
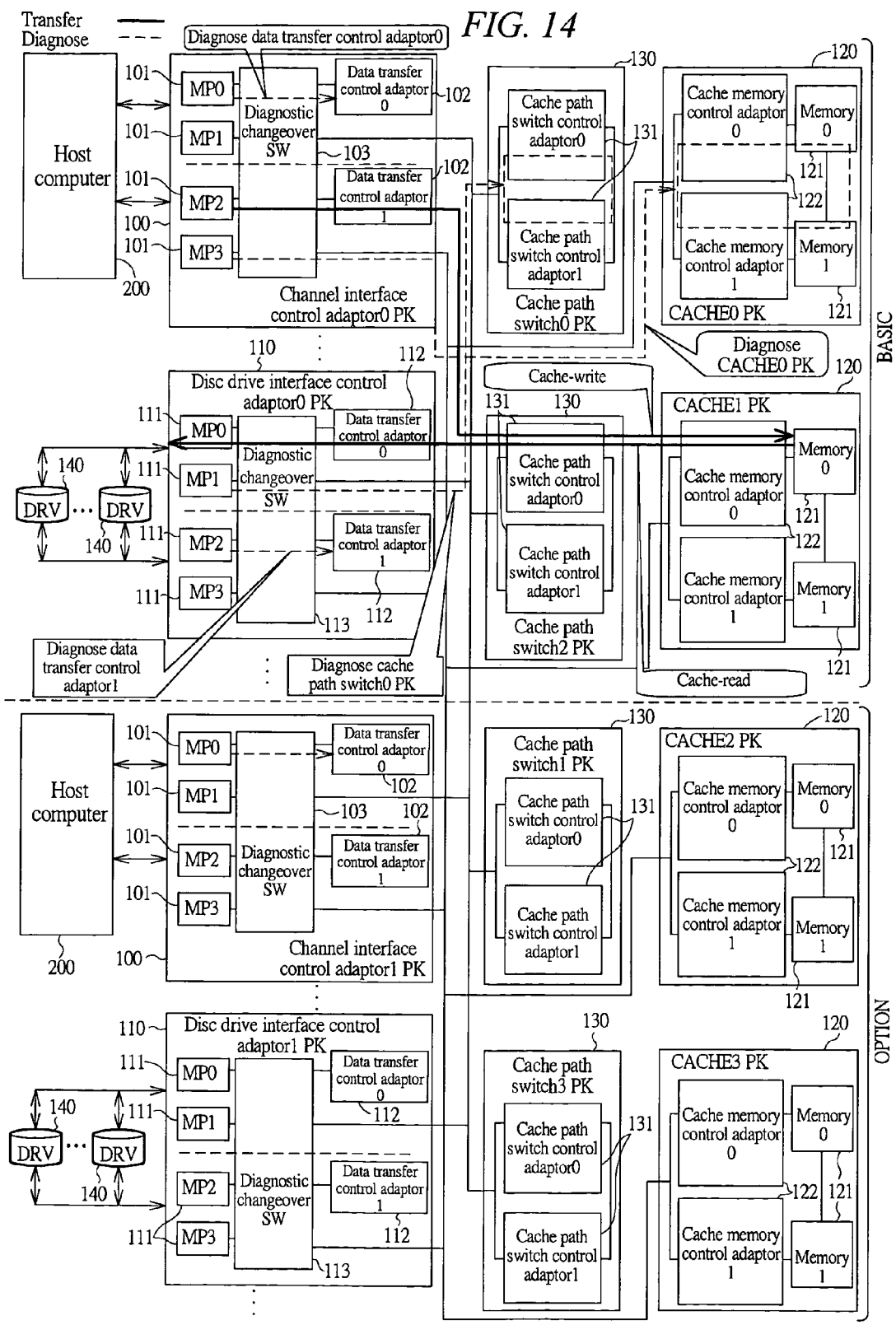
FIG. 14 is an explanatory view for explaining the diagnostic operation during the operation of the disc array device according to one embodiment of the present invention.
Figure 15:
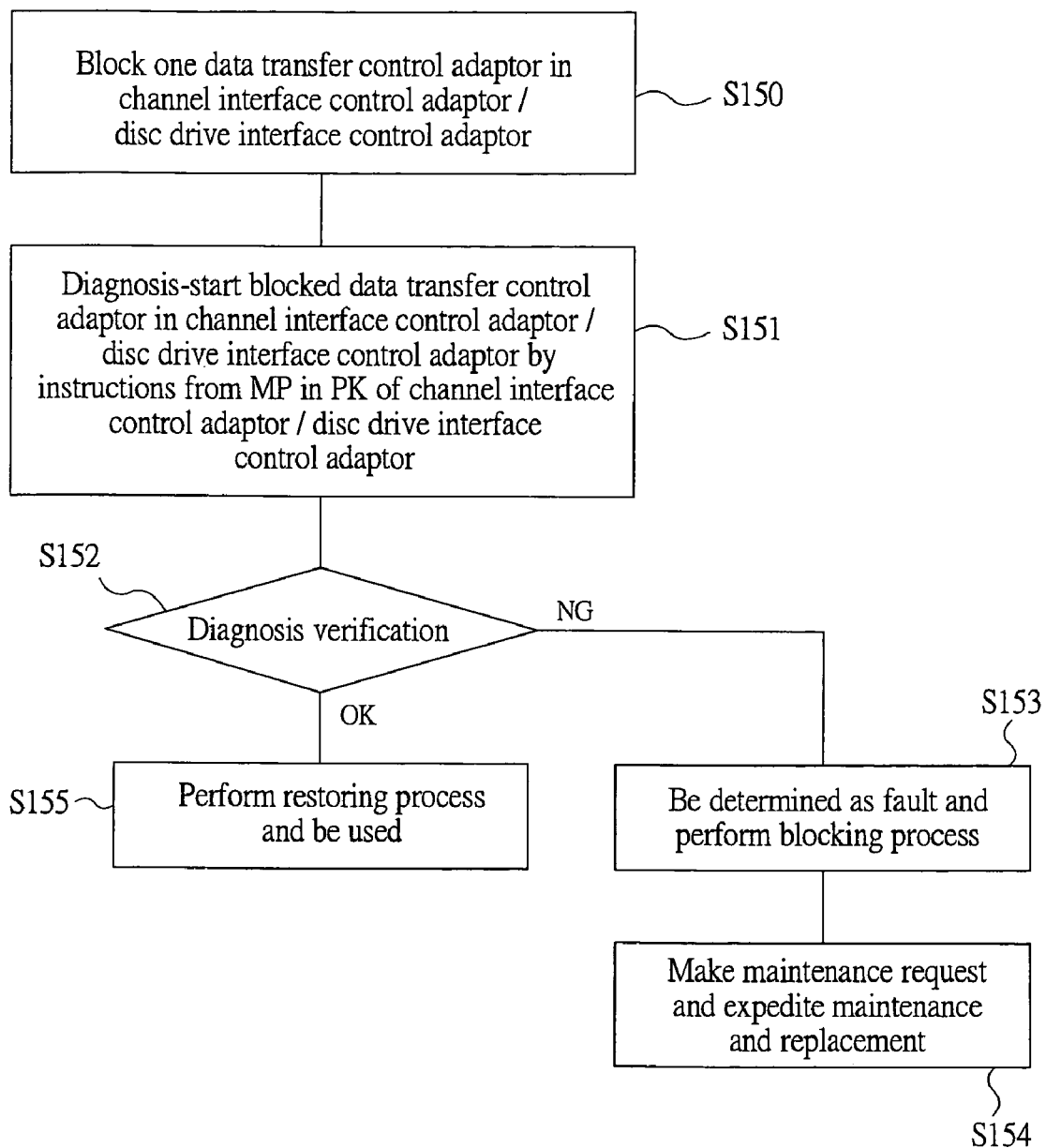
FIG. 15 is a flowchart showing the process operation of the diagnosis of the channel interface control adaptor/disc drive interface control adaptor during the operation of the disc array device according to one embodiment of the present invention.
Figure 16:
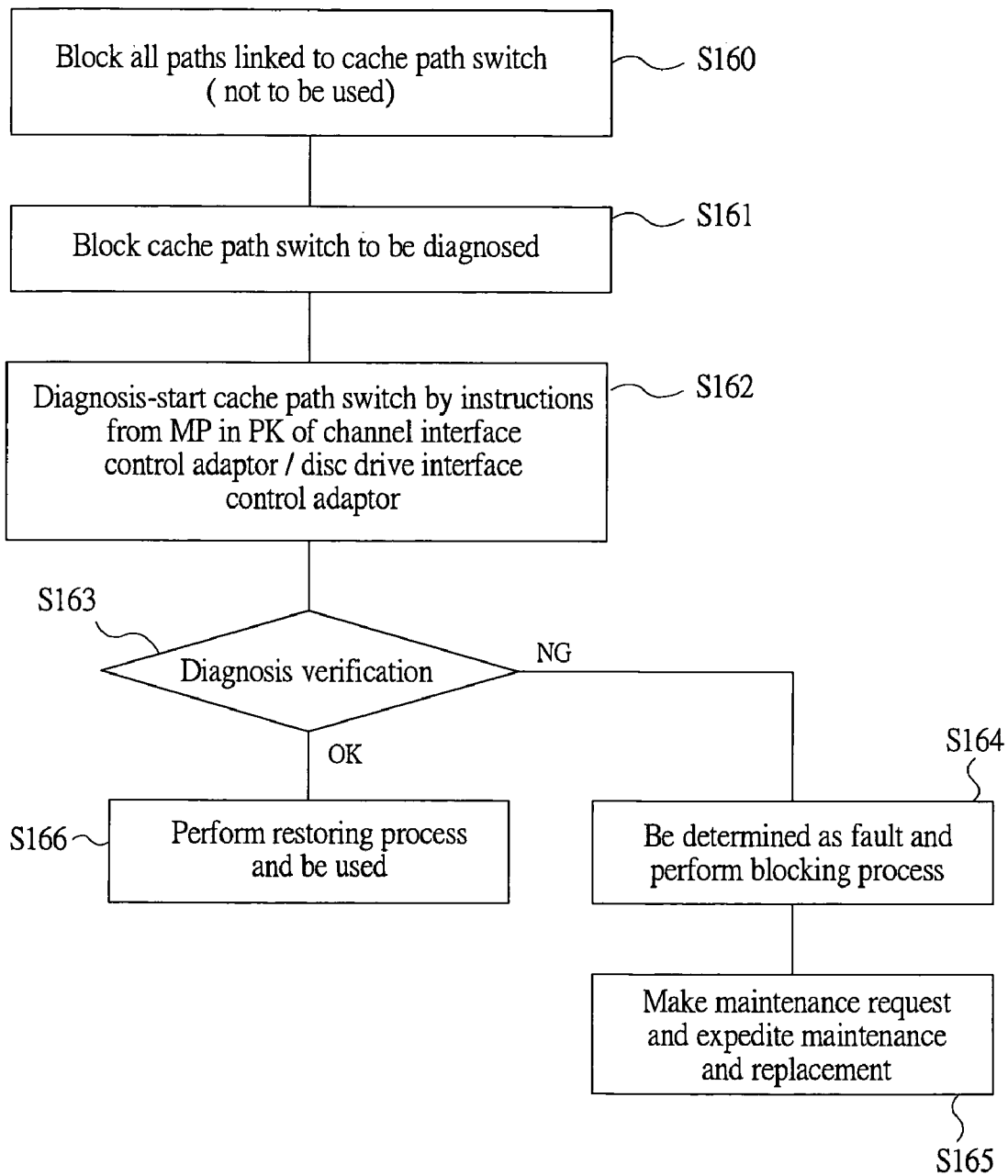
FIG. 16 is a flowchart showing the process operation of the diagnosis of the cache path switch during the operation of the disc array device according to one embodiment of the present invention.
Figure 17:
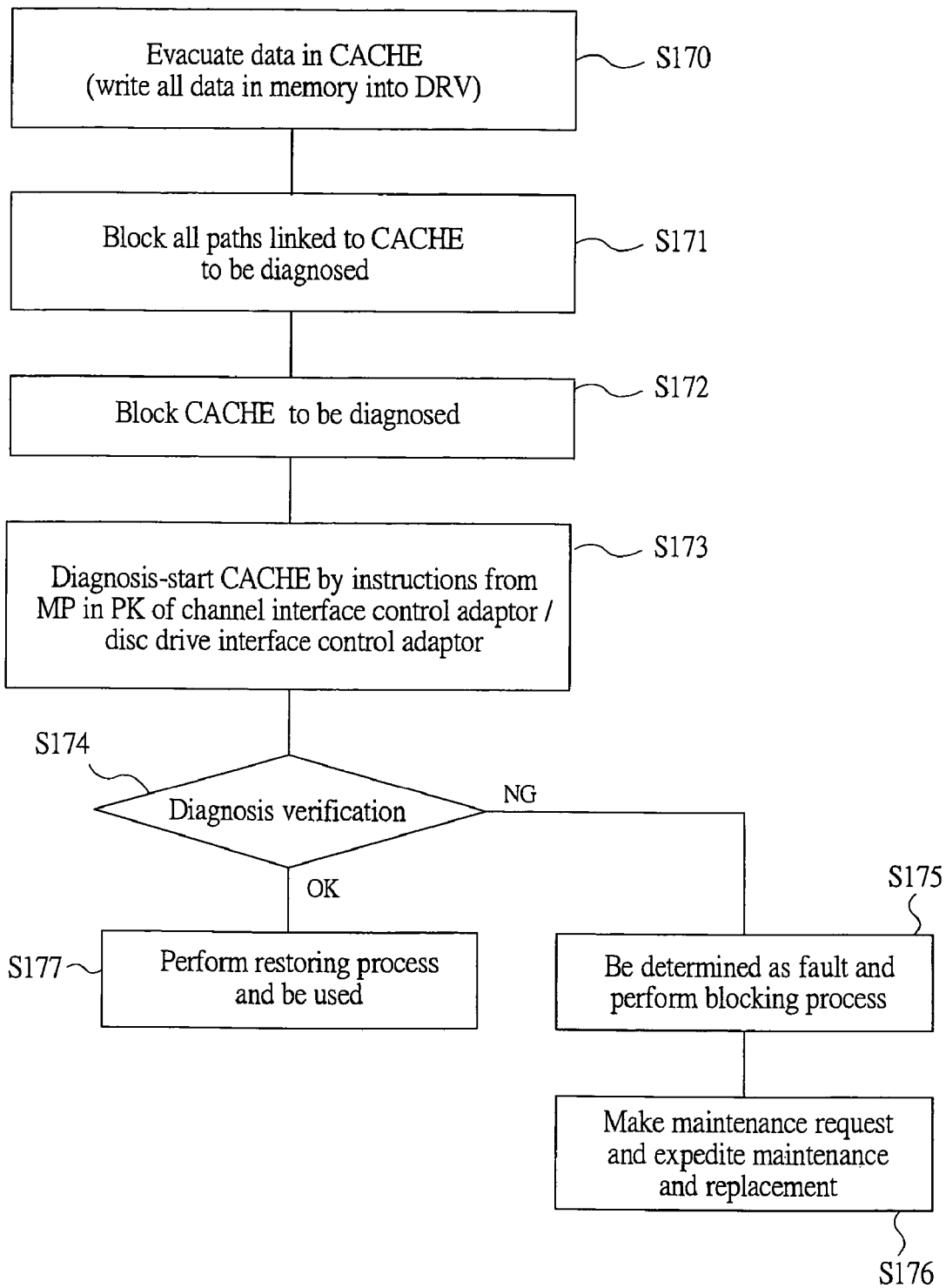
FIG. 17 is a flowchart showing the process operation of the diagnosis of the CACHE during the operation of the disc array device according to one embodiment of the present invention.

A diagnostic operation during the operation of the disc array device will be described with reference to FIGS. 13 to 17. FIGS. 13 and 14 are explanatory views for explaining a diagnostic operation during the operation of the device; FIG. 15 is a flowchart showing a process operation of a diagnosis of the channel interface control adaptor/disc drive interface control adaptor during the operation of the device; FIG. 16 is a flowchart showing a process operation of a diagnosis of the cache path switch during the operation of the device; and FIG. 17 is a flowchart showing a process operation of a diagnosis of the CACHE during the operation of the device.

In the diagnosis during the operation of the disc array device, as shown in FIG. 13, the data transfer is performed by instructions from the host computer 200. In the data transfer, for example, data is cache-written, by the MP 101 (MP 0) of the channel interface control adaptor 100 (channel interface control adaptor 0), in the memory 121 (MEM 0) within the CACHE 120 (CACHE 0) through the data transfer control adaptor 102 (data transfer control adaptor 0) of the channel interface control adaptor 100 (channel interface control adaptor 0) and the cache path switch 130 (cache path switch 0). Then, the data is cache-written by the MP 111 (MP 2) of the disc drive interface control adaptor 110 (disc drive interface control adaptor 0) so that it is written into the DRV 140 through the cache path switch 130 (cache path switch 0) and the data transfer control adaptor 112 (data transfer control adaptor 1) in the disc drive interface control adaptor 110 (disc drive interface control adaptor 0). The diagnosis is made by using one of the redundant constitutions of the channel interface control adaptor 100 and the disc drive interface control adaptor 110, during this data transfer.

As for the diagnosis at this time, for example, the diagnosis of the data transfer control adaptor 102 (data transfer control adaptor 1) is made by the MP 101 (MP 2) of the channel interface control adaptor 100 (channel interface control adaptor 0), and the diagnosis of the CACHE 120 (CACHE 1) is made by the MP 101 (MP 3) of the channel interface control adaptor 100 (channel interface control adaptor 0). Further, the diagnosis of the data transfer control adaptor 112 (data transfer control adaptor 0) is made by the MP 111 (MP 0) of the disc drive interface control adaptor 110 (disc drive interface control adaptor 0), and the diagnosis of the cache path switch 130 (cache path switch 2) is made by the MP 111 (MP 1) of the disc drive interface control adaptor 110 (disc drive interface control adaptor 0).

Further, after the diagnosis as shown in FIG. 13 has been completed, for example, as shown in FIG. 14, the data transfer is performed by instructions from the host computer 200. In the data transfer, for example, data is cache-written, by the MP 101 (MP 2) of the channel interface control adaptor 100 (channel interface control adaptor 0), in the memory 121 (MEM 0) within the CACHE 120 (CACHE 1) through the data transfer control adaptor 102 (data transfer control adaptor 1) of the channel interface control adaptor 100 (channel interface control adaptor 0) and the cache path switch 130 (cache path switch 2). Then, the data is cache-written into the MP 111 (MP 0) of the disc drive interface control adaptor 110 (disc drive interface control adaptor 0) and is transferred in such a stat that it is written in the DRV 140 through the cache path switch 130 (cache path switch 2) and the data transfer control adaptor 112 (data transfer control adaptor 0) of the disc drive interface control adaptor 110 (disc drive interface control adaptor 0). The diagnosis is made during this data transfer operation by using one of the redundant constitutions of the channel interface control adaptor 100 and the disc drive interface control adaptor 110.

As for the diagnosis at this time, the diagnosis of the data transfer control adaptor 102 (data transfer control adaptor 0)

is made, for example, by the MP 101 (MP 0) of the channel interface control adaptor 100 (channel interface control adaptor 0), and the diagnosis of the CACHE 120 (CACHE0) is made by the MP 101 (MP 3) of the channel interface control adaptor 100 (channel interface control adaptor 0). Further, the diagnosis of the data transfer control adaptor 112 (data transfer control adaptor 1) is made by the MP 111 (MP 2) of the disc drive interface control adaptor 110 (disc drive interface control adaptor 0), and the diagnosis of the cache path switch 130 (cache path switch 0) is made by the MP 111 (MP 1) of the disc drive interface control adaptor 110 (the disc drive interface control adaptor 0).

Note that, in the examples shown in FIGS. 13 and 14, although the diagnosis of only the basic portion (BASIC) is shown, it is also similarly possible to make the diagnosis of the expanded portion (OPTION).

Thus, even in a state of performing the data transfer during the operation of the disc array device, for example, it is possible to make the respective diagnoses of the interior of the channel interface control adaptor 100/disc drive interface control adaptor 110, the CACHE 120, and the cache path switch 130 by the MP 101/111 of the channel interface control adaptor 100/disc drive interface control adaptor 110, which has such a redundant constitution to have two or more than data transfer paths in the PK, without losing the data path of the data transfer.

Note that, in the diagnosis during the operation of the disc array device, the diagnoses of the plurality of PKs are not made simultaneously in order to affect the data transfer as little as possible, but its functions are diagnosed one by one. Therefore, since the CACHE 120 and the cache path switch 130 become a common portion, the diagnostic process is performed so as to shorten the diagnostic time as much as possible. For example, the diagnosis of each PK is made by a constant diagnostic period, thereby performing the diagnoses of all the PKs.

Further, in the case where there are a plurality of parts each having a BIST function in the interior of each PK, the self-diagnosis functions are activated so that they can be executed in parallel, and the use of the results make it possible to reduce the diagnostic time.

Further, as for the diagnostic period, the device, which can be turned off, can be diagnosed as an initial diagnosis at the power-on time, and the device, which cannot be turned off, can be diagnosed as a diagnosis during the operation of the disc array device.

Further, it is preferable that the diagnosis during the operation of the disc array device is made at the time when the data transfer is few. Or, if the time when the data transfer is not performed exists, it is preferable that the diagnosis is made during the time. Even in this case, since the data transfer path is secured by the redundant constitution, it is possible to immediately perform the data transfer process if there is any instructions of the data transfer from the host computer 200 and the like.

As for a process operation of the diagnosis during the operation of the disc array device, in the case of the diagnosis of the channel interface control adaptor 100/disc drive interface control adaptor 110, as shown in FIG. 15, first, one of the data transfer control adaptors 102/112 of the channel interface control adaptor 100/disc drive interface control adaptor 110 is blocked (S150); and the diagnosis of the blocked data transfer control adaptor 102/112 in the channel interface control adaptor 100/disc drive interface control adaptor 110 is started at S150, by instructions from the MP 101/111 in the PK of the channel interface control adaptor 100/disc drive interface control adaptor 110 (S151).

Then, diagnostic verification of the data transfer control adaptor 102/112 in the channel interface control adaptor 100/disc drive interface control adaptor 110 is performed (S152). If the result of the diagnosis at S152 is "NG", this is determined as a failure and a blocking process is performed (S153) and a request for its maintenance is made to expedite the maintenance and replacement (S154). If the result of the diagnosis at S152 is "OK", a restoring process is performed and the diagnosed PK is used (S155).

Further, in the case of the diagnosis of the cache path switch 130, as shown in FIG. 16, first, all paths linked to the cache path switch 130 to be diagnosed are blocked (so as not to be used) (S160); the cache path switch 130 to be diagnosed is blocked (S161); and the diagnosis of the cache path switch 130 blocked at S161 is started by instructions from the MP 101/111 in the PK of the channel interface control adaptor 100/disc drive interface control adaptor 110 (S162). Then, the diagnostic verification of the cache path switch 130 is performed (S163). If the result of the diagnosis at S163 is "NG", this is determined as a failure and a blocking process is performed (S164), and a maintenance request is made so as to expedite the maintenance and replacement (S165). If the result of the diagnosis at S163 is "OK", a restoring process is performed and the diagnosed PK is used (S166).

Further, in the case of the diagnosis of the CACHE 120, as shown in FIG. 17, first, data in the CACHE 120 to be diagnosed is evacuated (the data in the memory 121 is all written into the DRV 140) (S170); all paths linked to the CACHE 120 to be diagnosed are blocked (so as not to be used) (S171); the CACHE 120 to be diagnosed is blocked (S172); and the diagnosis of the CACHE 120 blocked at S172 is started by instructions from the MP 101/111 in the PK of the channel interface control adaptor 100/disc drive interface control adaptor 110(S173). Then, the diagnosis verification of the CACHE 120 is performed (S174). If the result of the diagnosis at S174 is "NG", this is determined as a failure and a blocking process is performed (S175), and a request for its maintenance is made so as to expedite the maintenance and replacement (S176). If the result of the diagnosis at S174 is "OK", a restoring process is performed and the diagnosed PK is used (S177).

Note that, as for the diagnosis verification at S152, S163, and S174, similarly to the initial diagnosis at the power-on time, the diagnostic verification is performed by using, for example, boundary scan, an Internal net connection diagnosis, a self-diagnosis by the BIST, and various functional diagnoses by software, etc. Further, also as for the diagnosis starting operations of the cache path switch 130 and the CACHE 120 at S162 and S173, similarly to the initial diagnosis at the power-on time, the MP 101/111 of each of the channel interface control adaptor 100/disc drive interface control adaptor 110 performs an exclusion, and the representative MP 101/111 performs the diagnosis, whereby the diagnosis can be performed also from all of the MPs 101/111 of the channel interface control adaptor 100/disc drive interface control adaptor 110.

Further, in the diagnoses of the cache path switch 130 and the CACHE 120, the cache path switch 130 and the CACHE 120 are a common portion. Therefore, in the case where the diagnosis of the disc array device is being made during its operation, even if there are available a plurality of cache path switches 130 and CACHEs 120, the next diagnosis, until one diagnosis is completed and restored, is not performed. Additionally, even in the case where the cache path switch 130 and the CACHE 120 are awaiting the replacement at the time of their failures, the diagnosis is not made.

<Diagnostic Method Depending on Type of PK>

Figure 18:
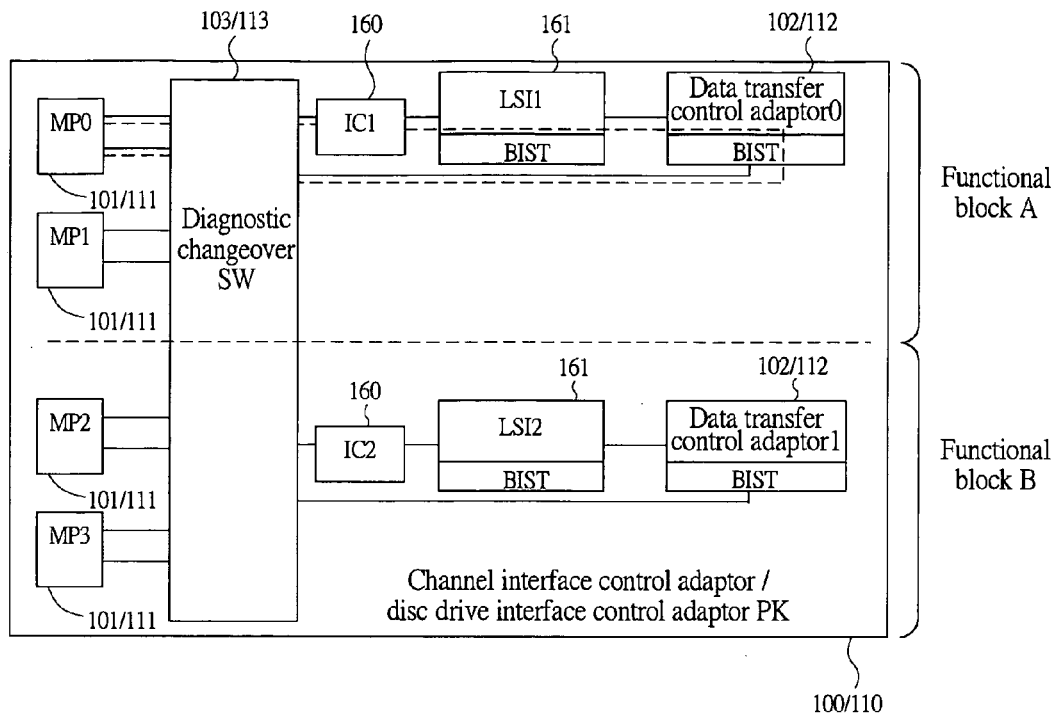
FIG. 18 is an explanatory view for explaining a diagnosis of a PK of the channel interface control adaptor/disc drive interface control adaptor of the disc array device according to one embodiment of the present invention.
Figure 19:
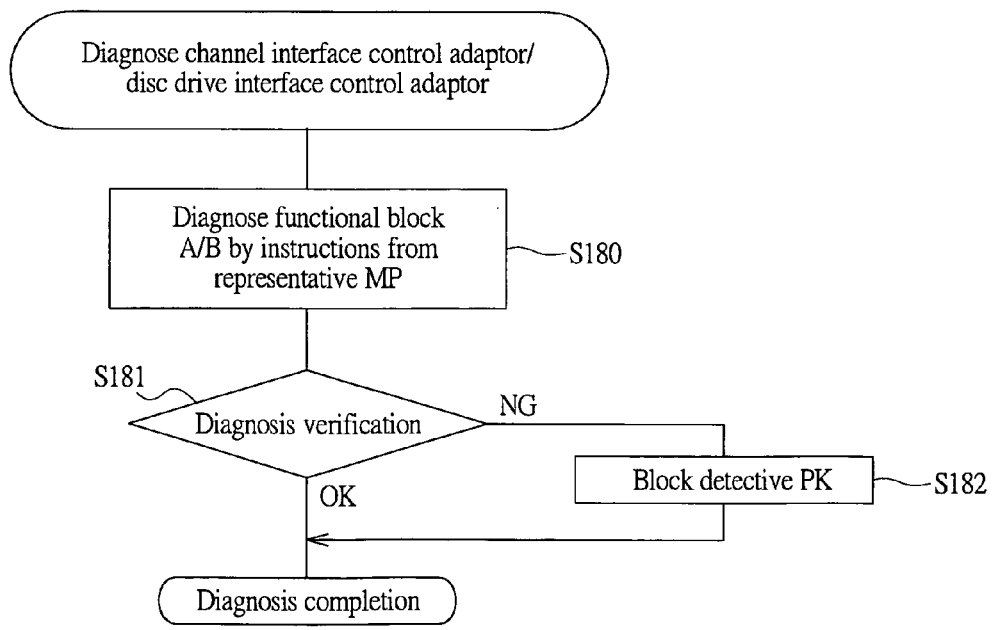
FIG. 19 is a flowchart showing the process operation of the diagnosis of the PK of the channel interface control adaptor/disc drive interface control adaptor of the disc array device according to one embodiment of the present invention.
Figure 20:
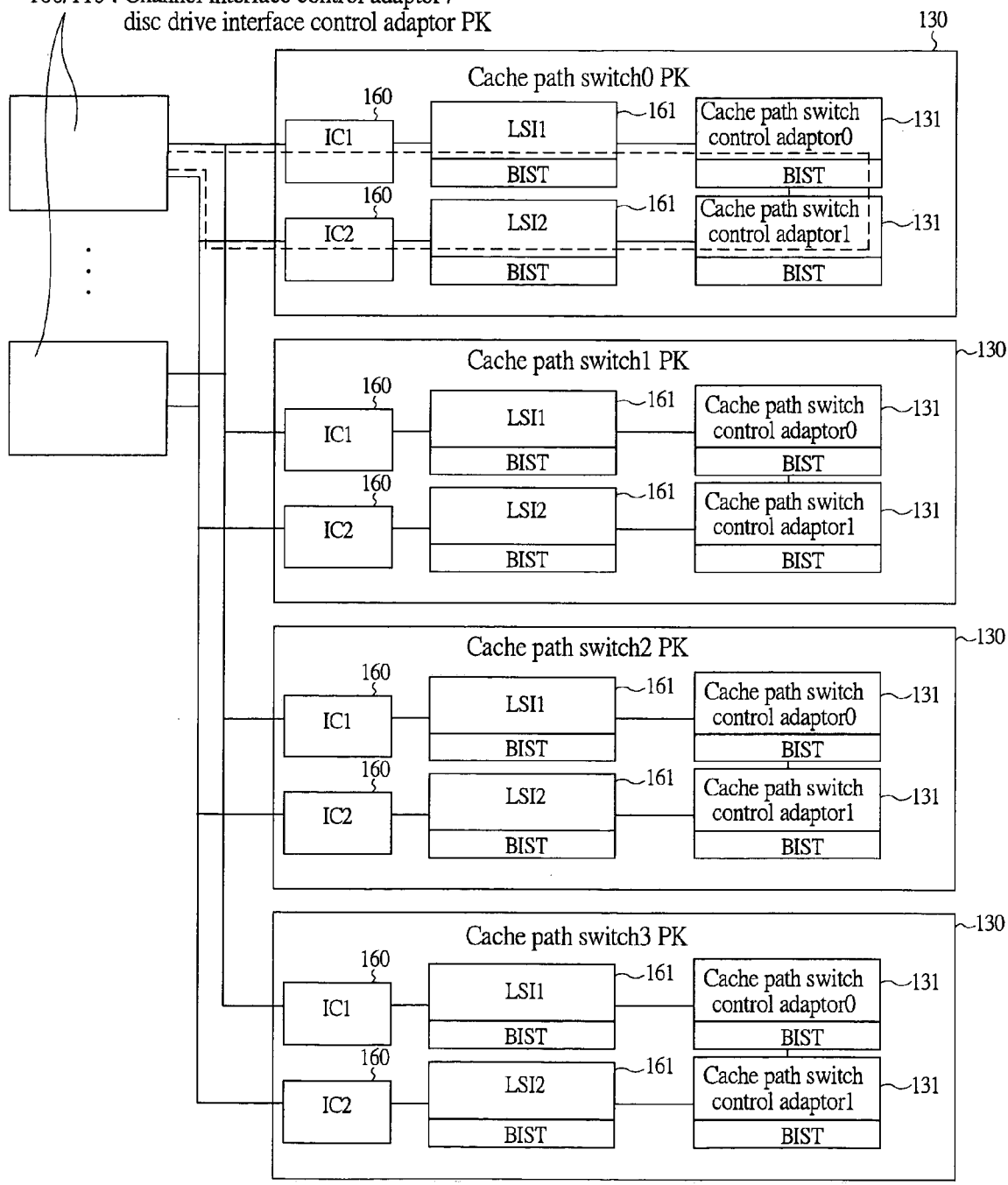
FIG. 20 is an explanatory view for explaining the diagnosis of the PK of the cache path switch of the disc array device according to one embodiment of the present invention.
Figure 21:
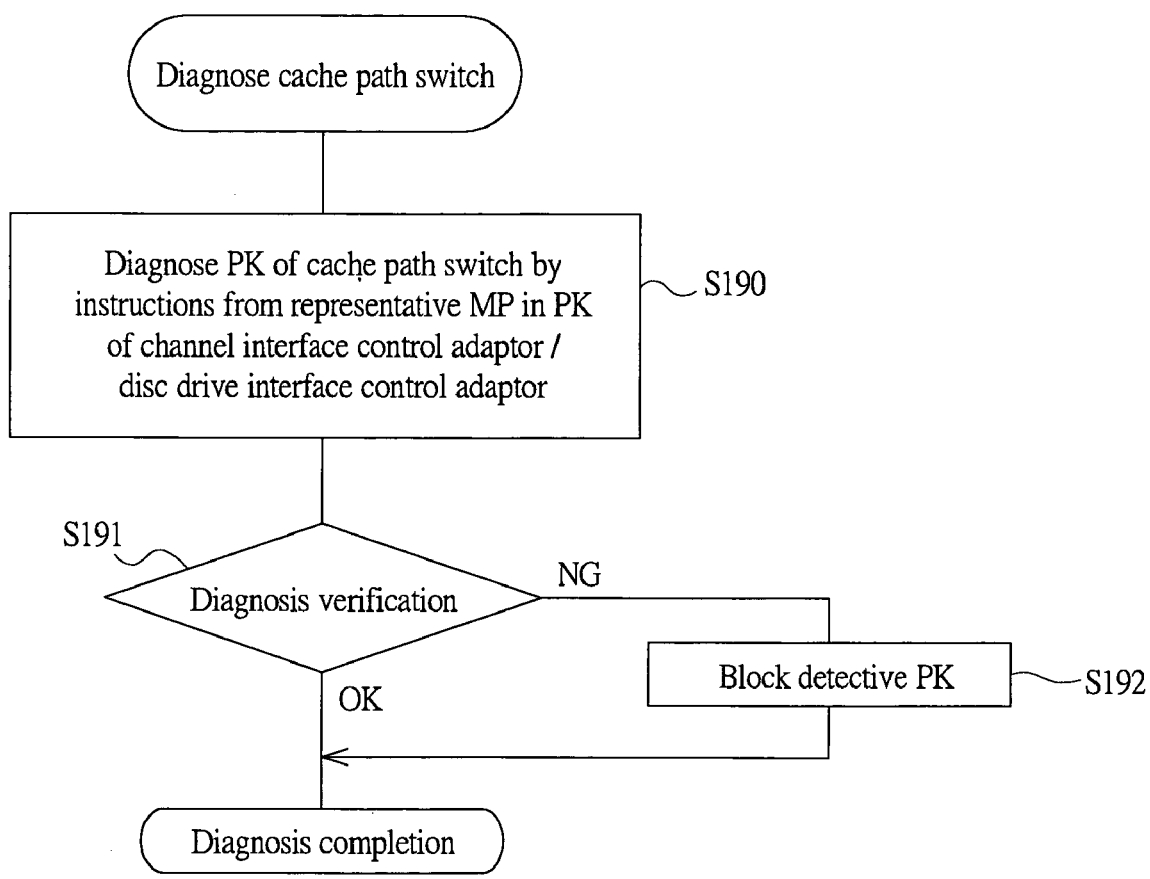
FIG. 21 is a flowchart showing the process operation of the diagnosis of the PK of the cache path switch of the disc array device according to one embodiment of the present invention.
Figure 22:
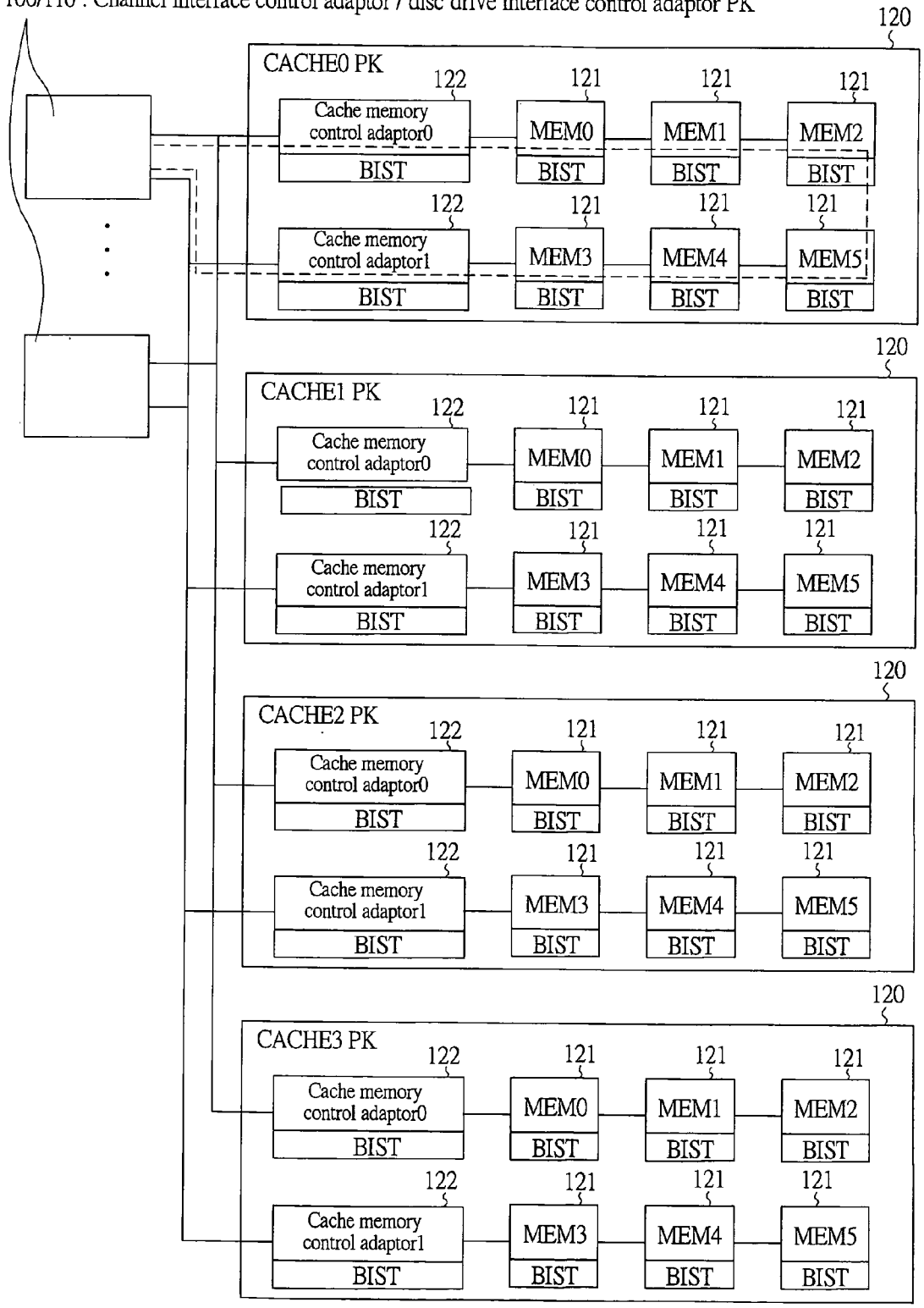
FIG. 22 is an explanatory view for explaining a diagnosis of a PK of the CACHE of the disc array device according to one embodiment of the present invention.
Figure 23:
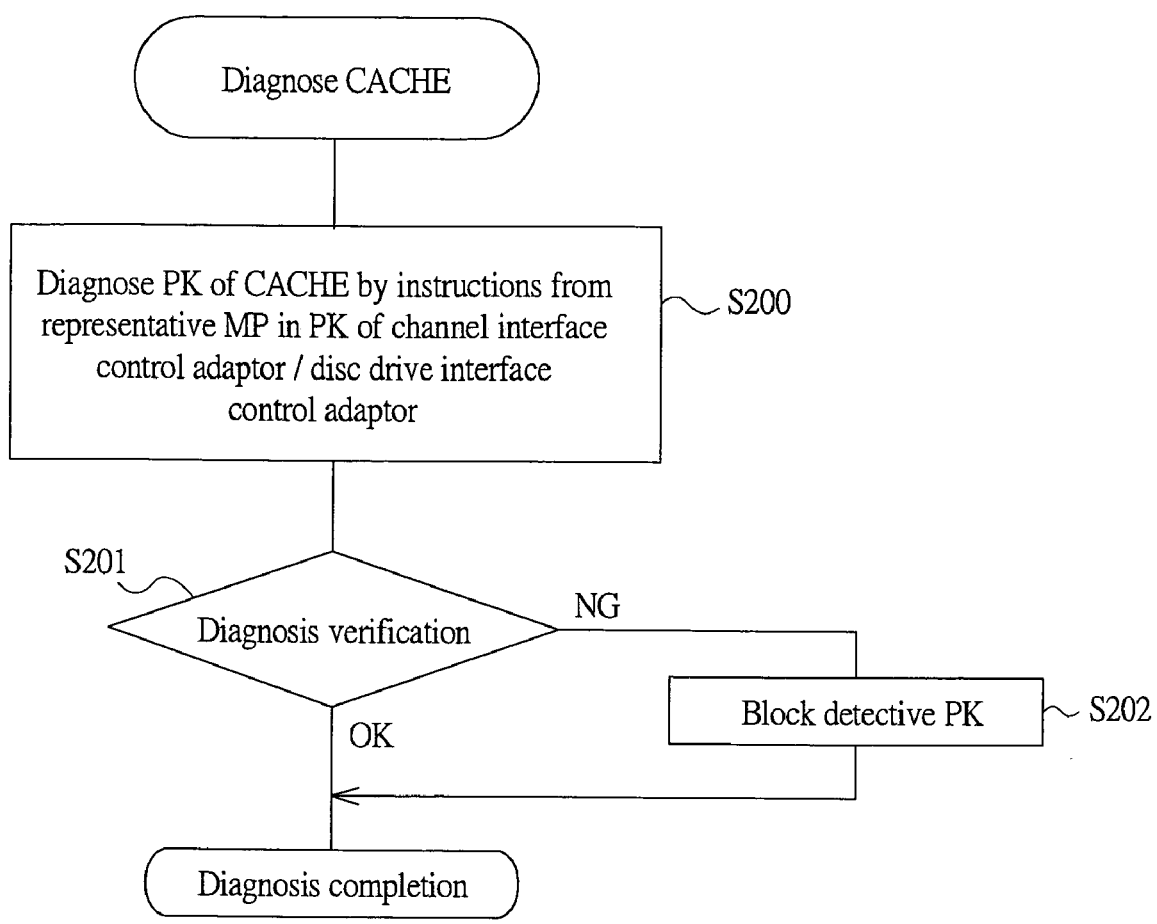
FIG. 23 is a flowchart showing the process operation of a diagnosis of a PK of the CACHE of the disc array device according to one embodiment of the present invention.
Figure 24:
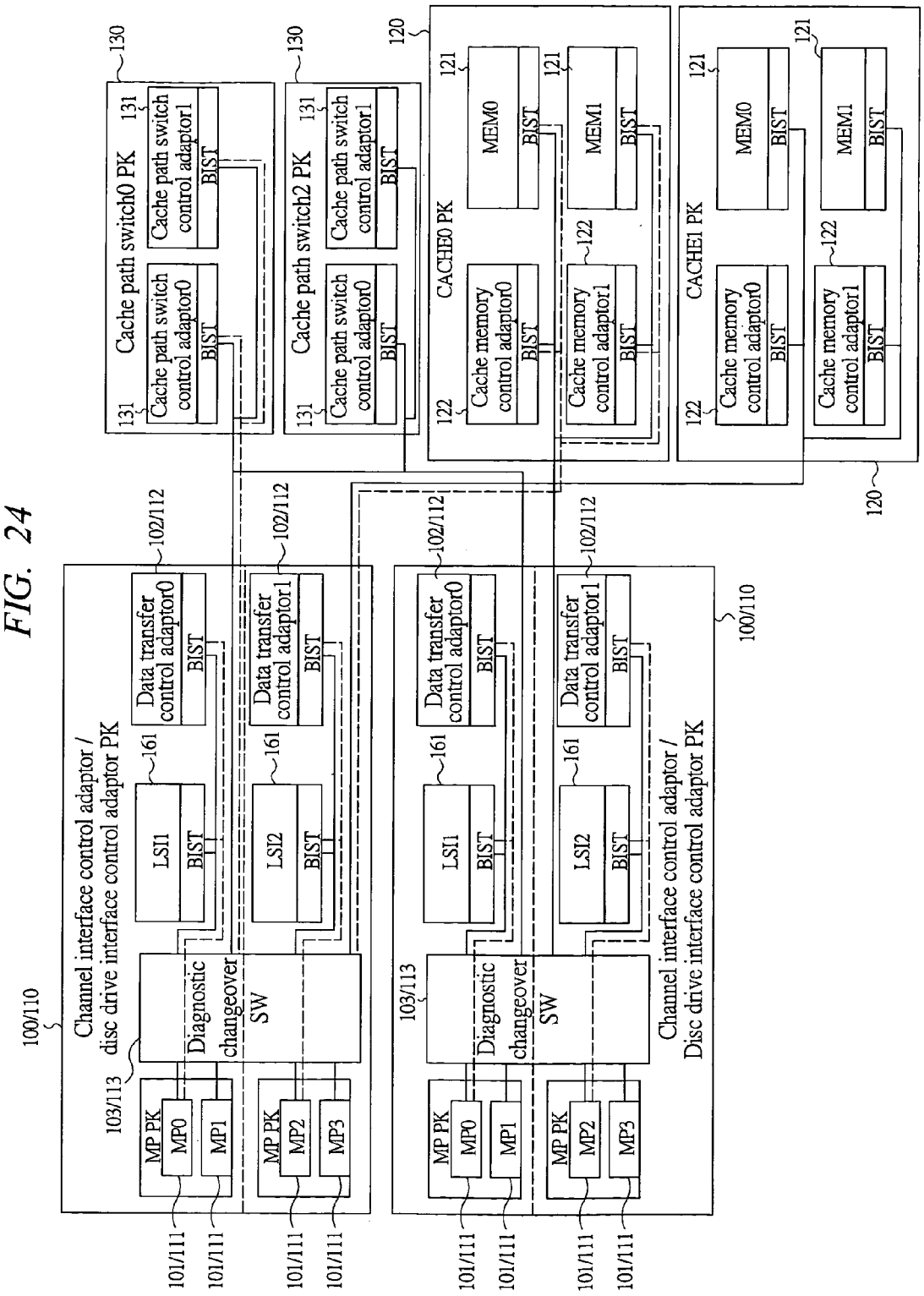
FIG. 24 is an explanatory view for explaining a diagnostic method corresponding to a type of each PK when a diagnostic connection of the disc array device according to one embodiment of the present invention is changed to a common bus system.

A diagnostic method depending on a type of the PK of the disc array device according to one embodiment of the present invention will be detailed with reference to FIGS. 18 to 24. FIG. 18 is an explanatory view for explaining a diagnosis of a PK of the channel interface control adaptor/disc drive interface control adaptor; FIG. 19 is a flowchart showing a process operation of the diagnosis of the PK of the channel interface control adaptor/disc drive interface control adaptor; FIG. 20 is an explanatory view for explaining a diagnosis of a PK of the cache path witch; FIG. 21 is a flowchart showing a process operation of the diagnosis of the PK of the cache path switch; FIG. 22 is an explanatory view for explaining the diagnosis of the PK of the CACHE; FIG. 23 is a flowchart showing the process operation of the diagnosis of the PK of the CACHE; and FIG. 24 is an explanatory view for explaining a diagnostic method depending on the type of each PK when the diagnostic connection is changed to a common bus system.

In FIGS. 18 and 20, as a diagnostic object, boundary scan corresponding parts 160 (IC 1 and IC 2) and boundary scan corresponding LSIs 161 (LSI 1 and LSI 2) are also connected by daisy chains.

In the case of the channel interface control adaptor 100/disc drive interface control adaptor 110, for example, as shown in FIG. 18, the boundary scan corresponding part 160 (IC 1), the boundary scan corresponding LSI 161 (LSI 1) and the data transfer control adaptor 102/112 (data transfer control adaptor 0) are connected by the daisy chains and are connected to the diagnostic changeover switch 103/113, while the boundary scan corresponding part 160 (IC 2), the boundary scan corresponding LSI 161 (LSI 2) and the data transfer control adaptor 102/112 (data transfer control adaptor 1) are connected by the daisy chains and are connected to the diagnostic changeover switch 103/113. With respect to the diagnosis of the interior of the channel interface control adaptor 100/disc drive interface control adaptor 110, for example, the diagnoses of the boundary scan corresponding part 160 (IC 1), the boundary scan corresponding LSI 161 (LSI 1), and the data transfer control adaptor 102/112 (data transfer control adaptor 0), or the diagnoses of the boundary scan corresponding part 160 (IC 2), the boundary scan corresponding part LSI 161 (LSI 2), and the data transfer adaptor 102/112 (data transfer control adaptor 1), which are connected by the daisy chains of the interior of the channel interface control adaptor 100/disc drive interface control adaptor 110, are made through the diagnostic changeover switch 103/113 from the representative MP 101/111 (MP0).

As for the process operation of the diagnosis of this channel interface control adaptor 100/disc drive interface control adaptor 110, as shown in FIG. 19, first, instructions from the representative MP 101/111 are given. In accordance with them, by accessing the boundary scan corresponding part 160 (IC 1), the boundary scan corresponding LSI 161 (LSI 1), the data transfer control adaptor 102/112 (data transfer control adaptor 0), or the boundary scan corresponding part 160 (IC 2), the boundary scan corresponding LSI 161 (LSI 2), and the data transfer control adaptor 102/112 (data transfer control adaptor 1), which are connected by the daisy chains, the diagnosis of a functional block A/B is made (S180). Then, the diagnostic verification in the channel interface control adaptor 100/disc drive interface control adaptor 110 is performed (S181). If the result of the diagnosis at S181 is "NG", the defective PK is blocked (S182).

If the result of the diagnosis at S181 is "OK" or the blocking of the defective PK at the S182 is performed, the diagnosis of the PK of the channel interface control adaptor 100/disc drive interface control adaptor 110 is completed.

Since this diagnosis is involved with the redundant constitutions, the data transfer is possible even when one of the redundant constitutions is during its diagnosis. Further, at the power-on time of the disc array device, the functional blocks A and B may be simultaneously diagnosed.

Further, in the case of the cache path switch 130, for example, as shown in FIG. 20, the boundary scan corresponding parts 160 (IC 1 and IC 2), the boundary scan corresponding LSIs 161 (LSI 1 and LSI 2), and the cache path switch control adaptors 131 (cache path switch control adaptors 0 and 1) are connected by the daisy chains and are connected to the diagnostic interface of the channel interface control adaptor 100/disc drive interface control adaptor 110 through the diagnostic interface of the PK of the cache path switch 130. As for the diagnosis of the cache path switch 130, for example, the boundary scan corresponding parts 160 (IC 1 and IC 2), the boundary scan corresponding LSIs 161 (LSI 1 and LSI 2), and the cache path switch control adaptors 131 (cache path switch control adaptors 0 and 1), which are connected by the daisy chains in the cache path switch 130, are diagnosed, from the MP 101/111 to become the representative of the channel interface control adaptor 100/disc drive interface control adaptor 110, through the diagnostic changeover switch 103/113 in the channel interface control adaptor 100/disc drive interface control adaptor 110, the diagnostic interface of the channel interface control adaptor 100/disc drive interface control adaptor 110, and the diagnostic interface of the PK of the cache path switch 130.

As for the process operation of the diagnosis of this cache path switch 130, as shown in FIG. 21, first, instructions from the MP 101/111 to become the representative of the channel interface control adaptor 100/disc drive interface control adaptor 110 are given. In accordance with them, by accessing the boundary scan corresponding parts 160 (IC 1 and IC 2), the boundary scan corresponding LSIs 161(LSI 1 and LSI 2), and the cache path switch control adaptors 131 (cache path switch control adaptors 0 and 1), which are connected by the daisy chains, the diagnosis of the cache path switch 130 is made (S190). Then, the diagnostic verification in the cache path switch 130 is performed (S191). If the result of the diagnosis at S191 is "NG", the defective PK is blocked (S192).

If the result of the diagnosis at S191 is "OK" or the blocking of the defective PK at S192 is performed, the diagnosis of the PK of the cache path switch 130 is completed.

Since this diagnosis is involved with the redundant constitutions, the data transfer is possible even when one of the redundant constitutions is during its diagnosis. Further, as for the diagnosis of the cache path switch 130, by the diagnostic changeover switch 103/113 in the channel interface control adaptor 100/disc drive interface control adaptor 110, diagnostic instructions can be received from both of the MP 101/111 in the channel interface control adaptor 100/disc drive interface control adaptor 110.

Further, in the case of the CACHE 120, for example, as shown in FIG. 22, the cache memory control adaptors 122 (cache memory control adaptors 0 and 1) and the memories 121 (MEM 0 to MEM 5) are connected by the daisy chains and are connected to the diagnostic interface of the channel interface control adaptor 100/disc drive interface control adaptor 110 through the diagnostic interface of the PK of the CACHE 120. as for the diagnosis of the CACHE 120, for example, the cache memory control adaptors 122 (cache memory control adaptors 0 and 1) and the memories 121

(MEM 0 to MEM 5), which are connected by the daisy chains in the CACHE 120, are diagnosed, from the MP 101/111 to become the representative of the channel interface control adaptor 100/disc drive interface control adaptor 110, through the changeover switch 103/113 in the channel interface control adaptor 100/disc drive interface control adaptor 110, the diagnostic interface of the channel interface control adaptor 100/disc drive interface control adaptor 110, and the diagnostic interface of the PK of the CACHE 120.

With respect to the memory 121, unless the memory 121 corresponds to the BIST, the diagnosis is made after the memory is removed from the daisy chains.

As for the process operation of the diagnosis of this CACHE 120, as shown in FIG. 23, first, instructions from the MP 101/111 to become the representative of the channel interface control adaptor 100/disc drive interface control adaptor 110 are given. In accordance with them, by accessing the cache memory control adaptors 122 (cache memory adaptor 0 and 1) and the memories 121 (MEM 0 to MEM 5), which are connected by the daisy chains, the diagnosis of the CACHE 120 is made (S200). Then, the diagnostic verification in the CACHE 120 is performed (S201). If the result of the diagnosis at S201 is "NG", the defective PK is blocked (S202).

Meanwhile, if the result of the diagnosis at S201 is "Ok" or the blocking of the defective PK at S202 is performed, the diagnosis of the PK of the CACHE 120 is completed.

Since this diagnosis is involved with the redundant constitutions, the data transfer is possible even when the one of the redundant constitutions is during its diagnosis. Further, as for the diagnosis of the CACHE 120, by the diagnostic changeover switch 103/113 in the channel interface control adaptor 100/disc drive interface control adaptor 110, the diagnostic instructions can be received also from both of the MP 101/111 in the channel interface control adaptor 100/disc drive interface control adaptor 110.

Note that, as for the diagnostic verification at S181, S191 and S201, for example, the boundary scan is used to perform the diagnostic verification by an Internal net connection diagnosis, a self-diagnosis by the BIST, and various functional diagnoses by software, etc.

Further, in the diagnosis when the daisy chain is changed to a common bus system, as shown in FIG. 24, the boundary scan corresponding LSI 161 (LSI 1) and the data transfer control adaptor 102/112 (data transfer control adaptor 0), and the boundary scan corresponding LSI 161 (LSI2) and the data transfer control adaptor 102/112 (data transfer control adaptor 1) in the channel interface control adaptor 100/disc drive interface control adaptor 110 are connected to the diagnostic changeover switch 103/113, respectively, by the common bus connection.

Further, the cache path switch control adaptors 131 (cache path switch control adaptor 0 and 1) in the cache path switches 130 (cache path switch 2) and the cache path switch control adaptors 131 (cache path switch control adaptor 0 and 1) in the cache path switch 130 (cache path switch 1) are connected, by the common bus connection, to the diagnostic interface of the channel interface control adaptor 100/disc drive interface control adaptor 110 through the diagnostic interface of the PK of the cache path switches 130 (cache path switch 0 and 2) and are connected to the diagnostic changeover switch 103/113 in the channel interface control adaptor 100/disc drive interface control adaptor 110.

Further, the cache memory control adaptors 122 (cache memory control adaptor 0 and 1) and the memories 121 (MEM 0 and MEM 1) in the CACHE 120 (CACHE 0), and the cache memory control adaptors 122 (cache memory control adaptor 0 and 1) and the memories 121 (MEM 0 and MEM 1) in the CACHE 120 (CACHE 1) are connected, by the common bus connection, to the diagnostic interface of the channel interface control adaptor 100/disc drive interface control adaptor 110 through the diagnostic interface of the PK of the CACHEs 120 (CACHE 0 and CACHE 1), and are connected to the diagnostic changeover switch 103/113 in the channel interface control adaptor 100/disc drive interface control adaptor 110.

At the time of diagnosing the PK of the channel interface control adaptor 100/disc drive interface control adaptor 110, the boundary scan corresponding LSI 161 (LSI 1) and the data transfer control adaptor 102/112 (data transfer control adaptor 0), or the boundary scan corresponding LSI 161 (LSI 2) and the data transfer control adaptor 102/112 (data transfer control adaptor 1) are diagnosed from the representative MP 101/111 through the diagnostic changeover switch 103/113. Since this diagnosis is involved with the redundant constitutions, the data transfer is possible even when one of the redundant constitutions is during its diagnosis.

Further, at the time of diagnosing the PK of the cache path switch 130, one of the PKs of the channel interface control adaptor 100/disc drive interface control adaptor 110 is chosen and the other PK is excluded. The cache path switch control adaptors 131 (cache path switch control adaptor 0 and 1) in the cache path switch 130 (cache path switch 0) are diagnosed from the representative MP 101/111 of the chosen channel interface control adaptor 100/disc drive interface control adaptor 110 through the diagnostic changeover switch 103/113, or the cache path switch control adaptors 131 (cache path switch control adaptor 0 and 1) in the cache path switch 130 (cache path switch 2) are diagnosed. This diagnosis is made so that either one of the above-mentioned manners is selected.

Further, at the time of diagnosing the PK of the CACHE 120, one of the PKs of channel interface control adaptor 100/disc drive interface control adaptor 110 is chosen and the other PK is excluded. The cache memory control adaptors 122 (cache memory control adaptors 0 and 1) and the memories 121 (MEM 0 and MEM 1) in the CACHE 120 (CACHE 0) are diagnosed from the representative MP 101/111 of the chosen channel interface control adaptor 100/disc drive interface control adaptor 110 through the diagnostic changeover switch 103/113, or the cache memory control adaptors 122 (cache memory control adaptors 0 and 1) and the memories 121 (MEM 0 and MEM 1) in the CAHCE 120 (CACHE 1) are diagnosed. This diagnosis is made so that either one of the above-mentioned manners is selected.

<Cutoff of PK at Diagnosis>

Figure 25:
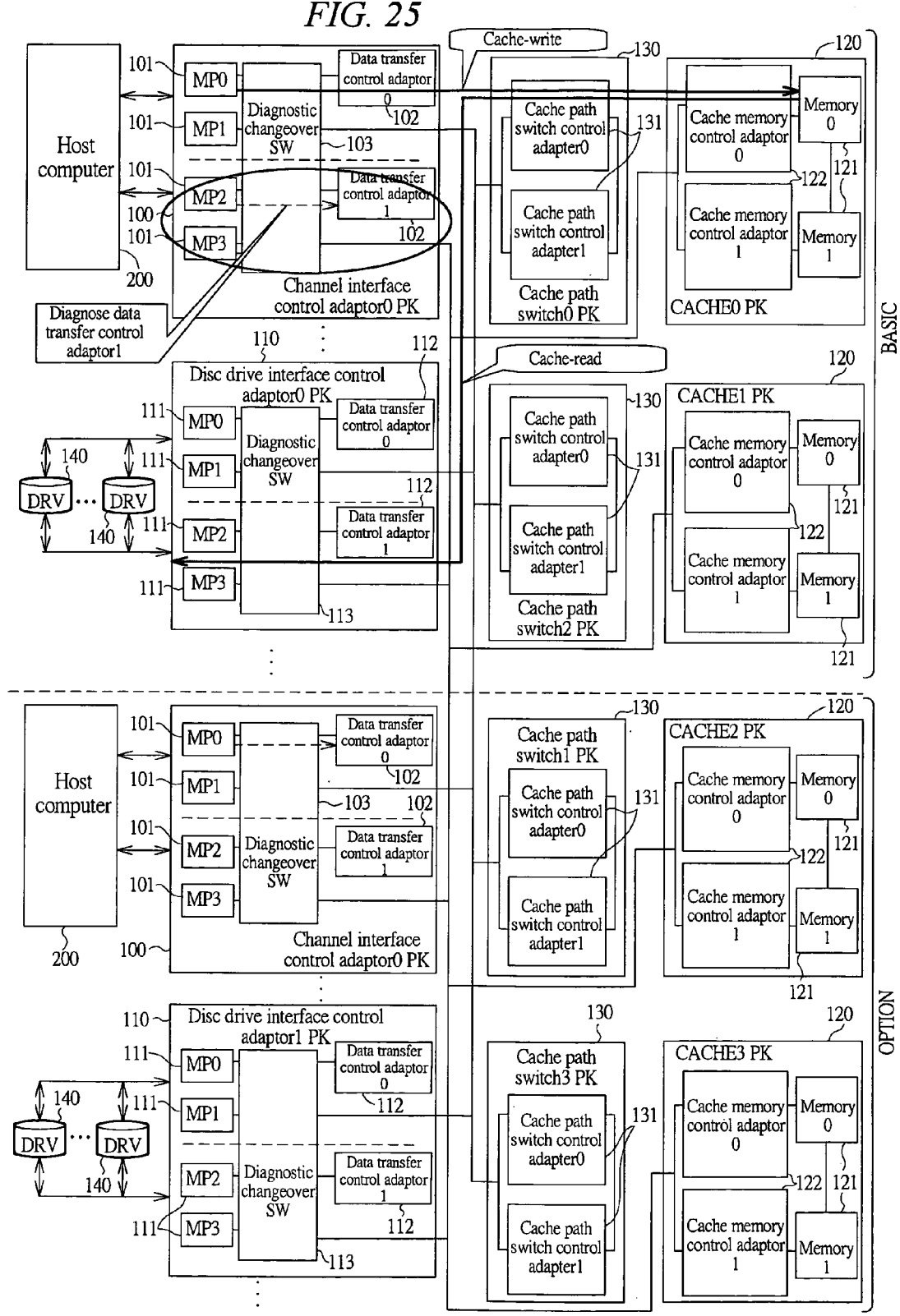
FIG. 25 is an explanatory view for explaining a cutoff of the PK at the time when the diagnosis is made during the operation of the disc array device according to one embodiment of the present invention.
Figure 26:
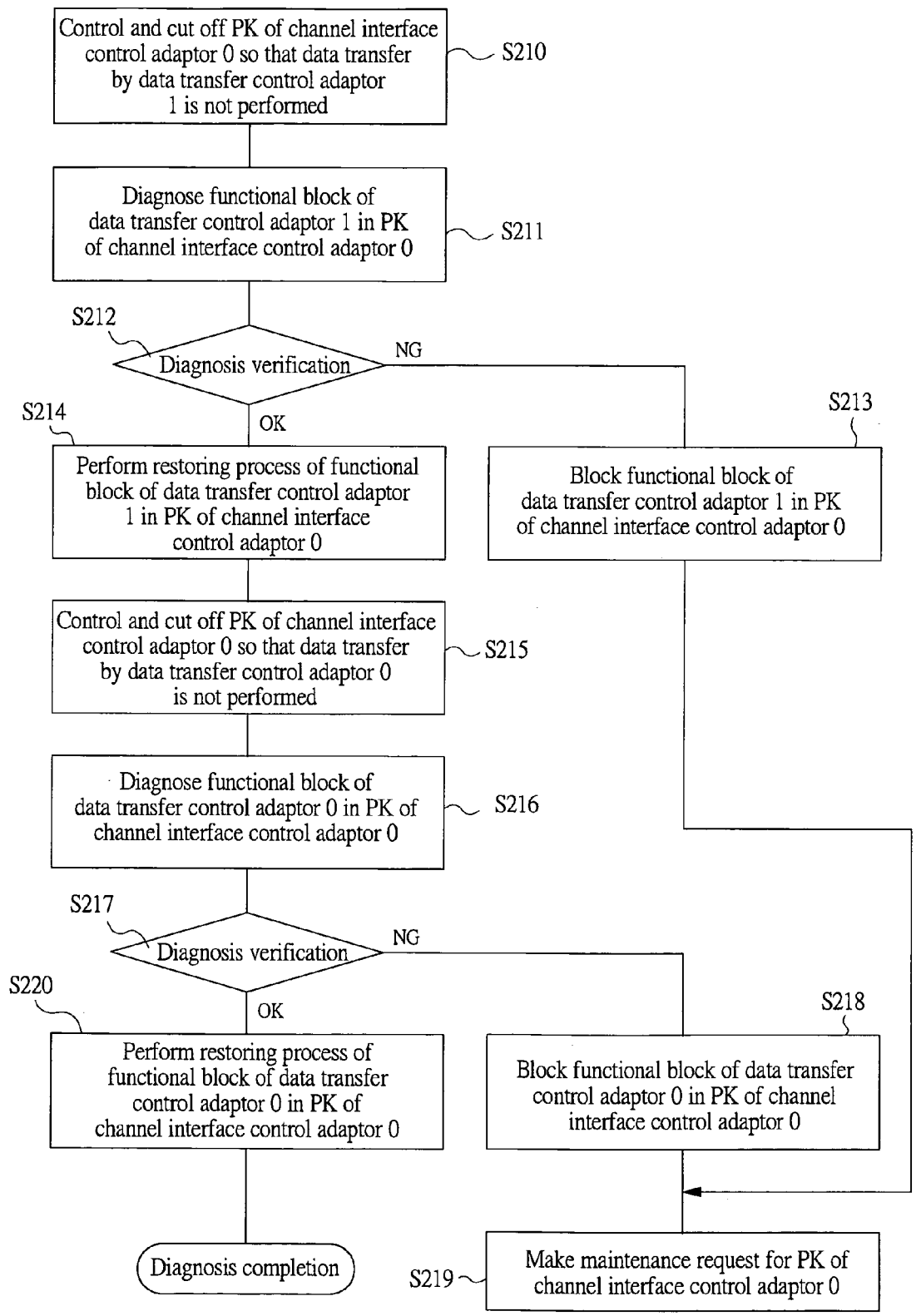
FIG. 26 is a flowchart showing one example of a cutoff operation of the PK at the time when the diagnosis is made during the operation of the disc array device according to one embodiment of the present invention.

Cutoff of the PK at the time of diagnosis in the operation of the disc array device according to one embodiment of the present invention will be described with reference to FIGS. 25 and 26. FIG. 25 is an explanatory view for explaining cutoff of the PK at the time of diagnosis during the operation of the device; and FIG. 26 is a flowchart showing one example of a cutoff operation of the PK at the time of the diagnosis during the operation of the device.

During the operation of the disc array device, in the case where the diagnosis is made when the data transfer is performed, it is necessary to cut off the data transfer control adaptor 102/112 in the PK of the channel interface control adaptor 100/disc drive interface control adaptor 110 to be diagnosed and to cut off the PK of the cache path switch 130 and the CACHE 120 to be diagnosed so as not to be data-transferred.

For example, as shown in FIG. 25, data is cache-written, by the MP 101 (MP 0) of the channel interface control adaptor 100 (channel interface control adaptor 0), in the memory 121 (MEM 0) within the CAHCE 120 (CACHE 0) through the data transfer control adaptor 102 (data transfer control adaptor 0) of the channel interface control adaptor 100 (channel interface control adaptor 0) and the cache path switch 130 (cache path switch 0). During the operation in which the data is cache-written, by the MP 111 (MP 2) of the disc drive interface control adaptor 110 (disc drive interface control adaptor 0) and is written, by the MP 111 (MP 2) of the disc drive interface control adaptor 110 (disc drive interface control adaptor 0), in the DRV 140 through the cache path switch 130 (cache path switch 0) and the data transfer control adaptor 112 (data transfer control adaptor 1) of the disc drive interface control adaptor 110 (disc drive interface control adaptor 0), when the diagnosis of the data transfer control adaptor 102 (data transfer control adaptor 1) of the channel interface control adaptor 100 (channel interface control adaptor 0) is made, this data transfer control adaptor 102 (data transfer control adaptor 1) is cut off so as not to be used for the data transfer.

Since the channel interface control adaptor 100 has a redundant constitution, it is possible to perform the data transfer only by the data transfer control adaptor 102 (data transfer control adaptor 0) even when the data transfer control adaptor 102 (data transfer control adaptor 1) is cut off. In the case of diagnosing the data transfer control adaptor 102 (data transfer control adaptor 0) after the diagnosis of the data transfer control adaptor 102 (data transfer control adaptor 1) has been made, the data transfer control adaptor 102 (data transfer control adaptor 1) is restored. Then, after the data transfer by the data transfer control adaptor 102 (data transfer control adaptor 1) has been performed, the data transfer control adaptor 102 (data transfer control adaptor 0) is cut off so as not to be used for the data transfer.

As for the cutoff process operation of the data transfer control adaptor 102 of this channel interface control adaptor 100, as shown in FIG. 26, first, for example, the PK of the channel interface control adaptor 100 (channel interface control adaptor 0) is controlled and cut off so that the data transfer by the data transfer control adaptor 102 (data transfer control adaptor 1) is not performed (S210).

The diagnosis of the functional block of the data transfer control adaptor 102 (data transfer control adaptor 1) in the PK of the channel interface control adaptor 100 (channel interface control adaptor 0) is performed (S211). Then, the diagnostic verification of the data transfer control adaptor 102 (data transfer control adaptor 1) in the PK of the channel interface control adaptor 100 (channel interface control adaptor 0) is performed (S212). If the result of the diagnosis at S212 is "NG", the functional block of the data transfer control adaptor 102 (data transfer control adaptor 1) in the PK of the channel interface control adaptor 100 (channel interface control adaptor 0) is blocked (S213).

Further, if the result of the diagnosis at S212 is "OK", the restoring process of the functional block of the data transfer control adaptor 102 (data transfer control adaptor 1) in the PK of the channel interface control adaptor 100 (channel interface control adaptor 0) is performed (S214), and the restoring process at S214 is completed. After the data transfer by the functional block of the data transfer control adaptor 102 (data transfer control adaptor 1) in the PK of the channel interface control adaptor 100 (channel interface control adaptor 0) is performed, the PK of the channel interface control adaptor 100 (channel interface control adaptor 0) is controlled and cut off so that the data transfer by the data transfer control adaptor 102 (data transfer control adaptor 0) is not performed (S215).

The diagnosis of the functional block of the data transfer control adaptor 102 (data transfer control adaptor 0) in the PK of the channel interface control adaptor 100 (channel interface control adaptor 0) is performed (S216). Then, the diagnosis verification of the functional block of the data transfer control adaptor 102 (data transfer control adaptor 0) in the PK of the channel interface control adaptor 100 (channel interface control adaptor 0) is performed (S217). If the result of the diagnosis at S217 is "NG", the functional block of the data transfer control adaptor 102 (data transfer control adaptor 0) in the PK of the channel interface control adaptor 100 (channel interface control adaptor 0) is blocked (S218).

When the functional block is blocked by S213 or S218, a maintenance request for the channel interface control adaptor 100 (channel interface control adaptor 0) is made (S219).

Additionally, if the result of the diagnosis at S217 is "OK", the restoring process of the functional block of the data transfer control adaptor 102 (data transfer control adaptor 0) in the PK of the channel interface control adaptor 100 (channel interface control adaptor 0) is performed (S220), whereby the diagnosis is completed.

Note that, similarly also in case of the diagnoses of the cache path switch 130 and the CACHE 120, the PKs of the cache path switch 130 and the CACHE 120 to be diagnosed are controlled and cut off so as not to be data-transferred. After the diagnostic process has been completed, the restoring process is performed, whereby the PK becomes in a data-transfer state. By repeating this process, the diagnosis during the operation of the disc array device is made.

Further, as for the maintenance request for the PK at S219, if at least one diagnostic result is "NG" in the diagnostic verification at S212 or S217, a maintenance request is made for a replacement request as maintenance.

As described above, in the present embodiment, even after the shipment of the disc array device, it is possible to make the hardware diagnoses of internal parts such as the channel interface control adaptor 100, the disc drive interface control adaptor 110, the cache memory 120, and the cache path switch 130, which constitute the disc array device, by the microprocessor 101/111 of each of the channel interface control adaptor 100 and the disc drive interface control adaptor 110 having redundantly constitutions. Additionally, the diagnostic rate can be also increased. Further, by adopting the redundant constitutions, the hardware diagnoses during the operation of the device can be also made.

As described above, the inventions made by the present inventors have been concretely described based on the embodiment. However, needless to say, the present invention is not limited to the above-mentioned embodiment and can be variously modified and altered without departing from the gist thereof.

Effects obtained by representative ones of inventions disclosed in the present application is summarized as follows.

According to the present invention, the hardware diagnosis after the shipment of the disc array device can be made at short times during the operation of the device, and the diagnostic rate can be also enhanced. Therefore, internal failures of LSIs can be detected at a device level.

What is claimed is:

1. A disc array device comprising:
   a channel interface control adaptor connected to a host computer and having a redundant constitution as an internal constitution in which data transfer and control are performed by a process of a microprocessor;

a plurality of disc drives for storing data;

a disc drive interface control adaptor connected to said disc drives and having a redundant constitution as an internal constitution in which data transfer and control are performed by a process of a microprocessor;

a cache memory in which data to be transferred between said host computer and each of said plurality of disc drives is temporarily stored; and a cache path switch connected to said channel interface control adaptor, the disc drive interface control adaptor, and the cache memory and making an internal bus connection, wherein said channel interface control adaptor, said disc drive interface control adaptor, said cache memory, and said cache path switch each has a data transfer interface and a diagnostic interface, by at least one microprocessor of said channel interface control adaptor having the redundant constitution, a hardware diagnosis of a part in said channel interface control adaptor is made, and hardware diagnoses of a part in said cache memory and a part in said cache path switch are made through said diagnostic interface of said channel interface control adaptor, and by at least one microprocessor of said disc drive interface control adaptor having the redundant constitution, a hardware diagnosis of a part in said disc drive interface control adaptor is made, and hardware diagnoses of a part in said cache memory and a part in said cache path switch are made through said diagnostic interface of said disc drive interface control adaptor.

2. The disc array device according to claim 1, wherein each microprocessor of said channel interface control adaptor and said disc drive interface control adaptor has a data transfer control port and a diagnostic control port, and said microprocessor makes a hardware diagnosis through said diagnostic control port.

3. The disc array device according to claim 2, wherein each of said channel interface control adaptor and said disc drive interface control adaptor has a diagnostic changeover switch selecting a part for making a hardware diagnosis, and the diagnostic control port of said microprocessor is connected to said diagnostic changeover switch, and said microprocessor makes a hardware diagnosis through said diagnostic control port and said diagnostic changeover switch.

4. The disc array device according to claim 1, wherein the part in said cache memory and the part in said cache path switch are so arranged that a diagnostic wiring of each part is connected by a daisy chain and connected to said diagnostic interface of said cache memory.

5. The disc array device according to claim 4, wherein each of the part in said channel interface control adaptor, the part in said disc drive interface control adaptor, the part in said cache memory, and the part in said cache path switch is a boundary scan corresponding part, and the microprocessor of said channel interface control adaptor and the microprocessor of said disc drive interface control adaptor make hardware diagnoses by boundary scan.

6. The disc array device according to claim 1, wherein each of the part in said channel interface control adaptor, the part in said disc drive interface control adaptor, the part in said cache memory, and the part in said cache path switch has a self-diagnosis function.

7. The disc array device according to claim 6, wherein the microprocessor of said channel interface control adaptor and the microprocessor of said disc drive interface control adaptor activate the self-diagnosis functions of said plural parts, and make the hardware diagnoses based on self-diagnosis results obtained from said plural parts.

8. The disc array device according to claim 1, wherein the hardware diagnosis at a power-on time of said disc array device is made by the plural microprocessors of said channel interface control adaptor having the redundant constitution and said disc drive interface control adaptor having the redundant constitution.

9. The disc array device according to claim 1, wherein the hardware diagnosis during an operation of said disc array device controls one of said plural microprocessors of said channel interface control adaptor having the redundant constitution and said disc drive interface control adaptor having the redundant constitution so as not to be used for the data transfer, and is made through said microprocessor not used for the data transfer.

10. A diagnostic control method of a disc array device including:

a channel interface control adaptor connected to a host computer and having a redundant constitution as an internal constitution in which data transfer and control are performed by a process of a microprocessor;

a plurality of disc drives for storing data;

a disc drive interface control adaptor connected to said disc drives and having a redundant constitution as an internal constitution in which data transfer and control are performed by a process of a microprocessor;

a cache memory in which data to be transferred between said host computer and each of said plurality of disc drives is temporarily stored; and a cache path switch connected to said channel interface control adaptor, the disc drive interface control adaptor, and the cache memory and making an internal bus connection, wherein said channel interface control adaptor, said disc drive interface control adaptor, said cache memory, and said cache path switch each has a data transfer interface and a diagnostic interface, the method comprising the steps of:

by at least one microprocessor of said channel interface control adaptor having the redundant constitution, making a hardware diagnosis of a part in said channel interface control adaptor, and making hardware diagnoses of a part in said cache memory and a part in said cache path switch through said diagnostic interface of said channel interface control adaptor; and by at least one microprocessor of said disc drive interface control adaptor having the redundant constitution, making a hardware diagnosis of a part in said disc drive interface control adaptor, and making hardware diagnoses of a part in said cache memory and a part in said cache path switch through said diagnostic interface of said disc drive interface control adaptor.

11. The diagnostic control method of a disc array device according to claim 10, wherein each microprocessor of said channel interface control adaptor and said disc drive interface control adaptor has a data transfer control port and a diagnostic control port, and said microprocessor makes a hardware diagnosis through said diagnostic control port.

12. The diagnostic control method of a disc array device according to claim 11, wherein each of said channel interface control adaptor and said disc drive interface control adaptor has a diagnostic changeover switch selecting a part for making a hardware diagnosis, and the diagnostic control port of said microprocessor is connected to said diagnostic changeover switch, and said microprocessor makes a hardware diagnosis through said diagnostic control port and said diagnostic changeover switch.

13. The diagnostic control method of a disc array device according to claim 10, wherein the part in said cache memory and the part in said cache path switch are so arranged that a diagnostic wiring of each part is connected by a daisy chain and connected to said diagnostic interface of said cache memory.

14. The diagnostic control method of a disc array device according to claim 13, wherein each of the part in said channel interface control adaptor, the part in said disc drive interface control adaptor, the part in said cache memory, and the part in said cache path switch is a boundary scan corresponding part, and the microprocessor of said channel interface control adaptor and the microprocessor of said disc drive interface control adaptor make hardware diagnoses by boundary scan.

15. The diagnostic control method of a disc array device according to claim 10, wherein each of the part in said channel interface control adaptor, the part in said disc drive interface control adaptor, the part in said cache memory, and the part in said cache path switch has a self-diagnosis function.

16. The diagnostic control method of a disc array device according to claim 15, wherein the microprocessor of said channel interface control adaptor and the microprocessor of said disc drive interface control adaptor activate the self-diagnosis functions of said plural parts, and make the hardware diagnoses based on self-diagnosis results obtained from said plural parts.

17. The diagnostic control method of a disc array device according to claim 10, wherein the hardware diagnosis at a power-on time of said disc array device is made by the plural microprocessors of said channel interface control adaptor having the redundant constitution and said disc drive interface control adaptor having the redundant constitution.

18. The diagnostic control method of a disc array device according to claim 10, wherein the hardware diagnosis during an operation of said disc array device controls one of said plural microprocessors of said channel interface control adaptor having the redundant constitution and said disc drive interface control adaptor having the redundant constitution so as not to be used for the data transfer, and is made through said microprocessor not used for the data transfer.

* * * * *